US011078962B2

(12) United States Patent
Wild et al.

(10) Patent No.: US 11,078,962 B2
(45) Date of Patent: Aug. 3, 2021

(54) BEARING ASSEMBLY SUPPORT

(71) Applicant: Cummins Ltd, Huddersfield (GB)

(72) Inventors: Philip Wild, Huddersfield (GB); Richard Goodyear, Huddersfield (GB); Christopher Normington, Huddersfield (GB)

(73) Assignee: Cummins Ltd., Huddersfield (GB)

( * ) Notice: Subject to any disclaimer, the term of this patent is extended or adjusted under 35 U.S.C. 154(b) by 108 days.

(21) Appl. No.: 14/757,704

(22) Filed: Dec. 23, 2015

(65) Prior Publication Data

US 2016/0201727 A1   Jul. 14, 2016

(30) Foreign Application Priority Data

Dec. 23, 2014 (GB) ...................................... 1423054

(51) Int. Cl.
  *F01D 25/16* (2006.01)
  *F16C 33/66* (2006.01)
  (Continued)

(52) U.S. Cl.
  CPC .......... *F16C 33/6685* (2013.01); *F01D 25/16* (2013.01); *F01D 25/162* (2013.01);
  (Continued)

(58) Field of Classification Search
  CPC .... F16C 33/6685; F16C 35/042; F16C 19/08; F16C 19/184; F16C 2360/00; F16C 17/10;
  (Continued)

(56) References Cited

U.S. PATENT DOCUMENTS 3,390,926 A * 7/1968 Woollenweber, Jr. ...................... F01D 25/166 384/287
4,145,334 A   3/1979 Schmidt et al.
(Continued)

FOREIGN PATENT DOCUMENTS

EP         2299066 A2      3/2011
JP   WO 2009133445 A1 * 11/2009   ........... F01D 25/162
(Continued)

OTHER PUBLICATIONS

Search Report issued by the United Kingdom Intellectual Property Office, dated Jun. 5, 2015, for related Application No. GB1423054.4; 4 pages.
(Continued)

*Primary Examiner* — Zelalem Eshete
(74) *Attorney, Agent, or Firm* — Faegre Drinker Biddle & Reath LLP

(57) ABSTRACT

A bearing assembly support comprises a body, the body defining: a thrust surface; an aperture extending through the body; and at least one passageway along which a lubricant can flow away from the thrust surface during use. The thrust surface is suitable for contacting an end of a bearing assembly. The aperture is suitable for receipt of a shaft when supported by the bearing assembly. Each passageway may be defined by a recess on the thrust surface or a cut away section that extends through the body from the thrust surface to an opposite surface of the body. The body may be a housing for receipt of a bearing assembly or an end cap for a housing.

33 Claims, 21 Drawing Sheets

(51) Int. Cl.
*F01D 25/18* (2006.01)
*F16C 19/08* (2006.01)
*F16C 35/04* (2006.01)
*F16C 19/18* (2006.01)

(52) U.S. Cl.
CPC .............. *F01D 25/18* (2013.01); *F16C 19/08* (2013.01); *F16C 35/042* (2013.01); *F05D 2220/30* (2013.01); *F05D 2220/40* (2013.01); *F05D 2240/54* (2013.01); *F05D 2260/98* (2013.01); *F16C 19/184* (2013.01); *F16C 2360/00* (2013.01)

(58) Field of Classification Search
CPC ...... F16C 17/102; F16C 17/107; F16C 17/18; F16C 2360/24; F16C 17/04; F16C 21/00; F16C 33/106; F16C 33/1065; F16C 33/6681–6685; F01D 25/16; F01D 25/162; F01D 25/18; F01D 25/166; F05D 2220/30; F05D 2220/40; F05D 2260/98; F05D 2240/54; F05B 2220/40; F04D 9/065; F02C 6/12; F02B 39/14
USPC ...... 415/110, 229, 1, 111, 112, 107; 29/898; 384/462, 13, 901, 286, 477; 417/407
See application file for complete search history.

(56) References Cited

U.S. PATENT DOCUMENTS

| | | | | |
|---|---|---|---|---|
| 5,145,334 | A * | 9/1992 | Gutknecht | F01D 25/164 417/407 |
| 5,454,646 | A * | 10/1995 | Reisdorf | F04D 29/057 384/99 |
| 6,709,160 | B1 * | 3/2004 | Ward | F01D 25/166 384/286 |
| 8,845,271 | B2 * | 9/2014 | Woollenweber | F02C 6/12 415/107 |
| 9,759,093 | B2 * | 9/2017 | Donaldson | F01D 25/16 |
| 2002/0141862 | A1 * | 10/2002 | McEwen | F01D 25/18 415/111 |
| 2004/0200215 | A1 * | 10/2004 | Woollenweber | F01D 15/10 60/407 |
| 2011/0110766 | A1 * | 5/2011 | Moore | F01D 17/143 415/158 |
| 2011/0176907 | A1 * | 7/2011 | Groves | F01D 25/166 415/1 |
| 2014/0228168 | A1 | 8/2014 | Kaufman et al. | |
| 2014/0369865 | A1 * | 12/2014 | Marsal | B23P 11/005 417/406 |
| 2015/0337721 | A1 * | 11/2015 | Kocher | F01D 25/18 415/111 |
| 2016/0032970 | A1 * | 2/2016 | Dehne | F16C 17/18 384/293 |

FOREIGN PATENT DOCUMENTS

| | | |
|---|---|---|
| JP | 2010138753 A | 6/2010 |
| JP | 2013181619 A | 9/2013 |
| WO | WO 98/23886 | 6/1998 |
| WO | WO 2009/133445 A1 | 11/2009 |
| WO | WO-2009133445 A1 * | 11/2009 ........... F01D 25/162 |
| WO | WO 2014/088824 A1 | 6/2014 |

OTHER PUBLICATIONS

Search Report issued by the United Kingdom Intellectual Property Office, dated May 18, 2016, for related Application No. GB1522734.1; 5 pages.

* cited by examiner

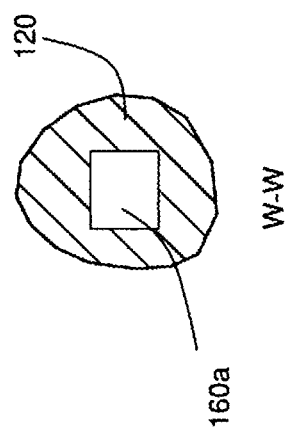

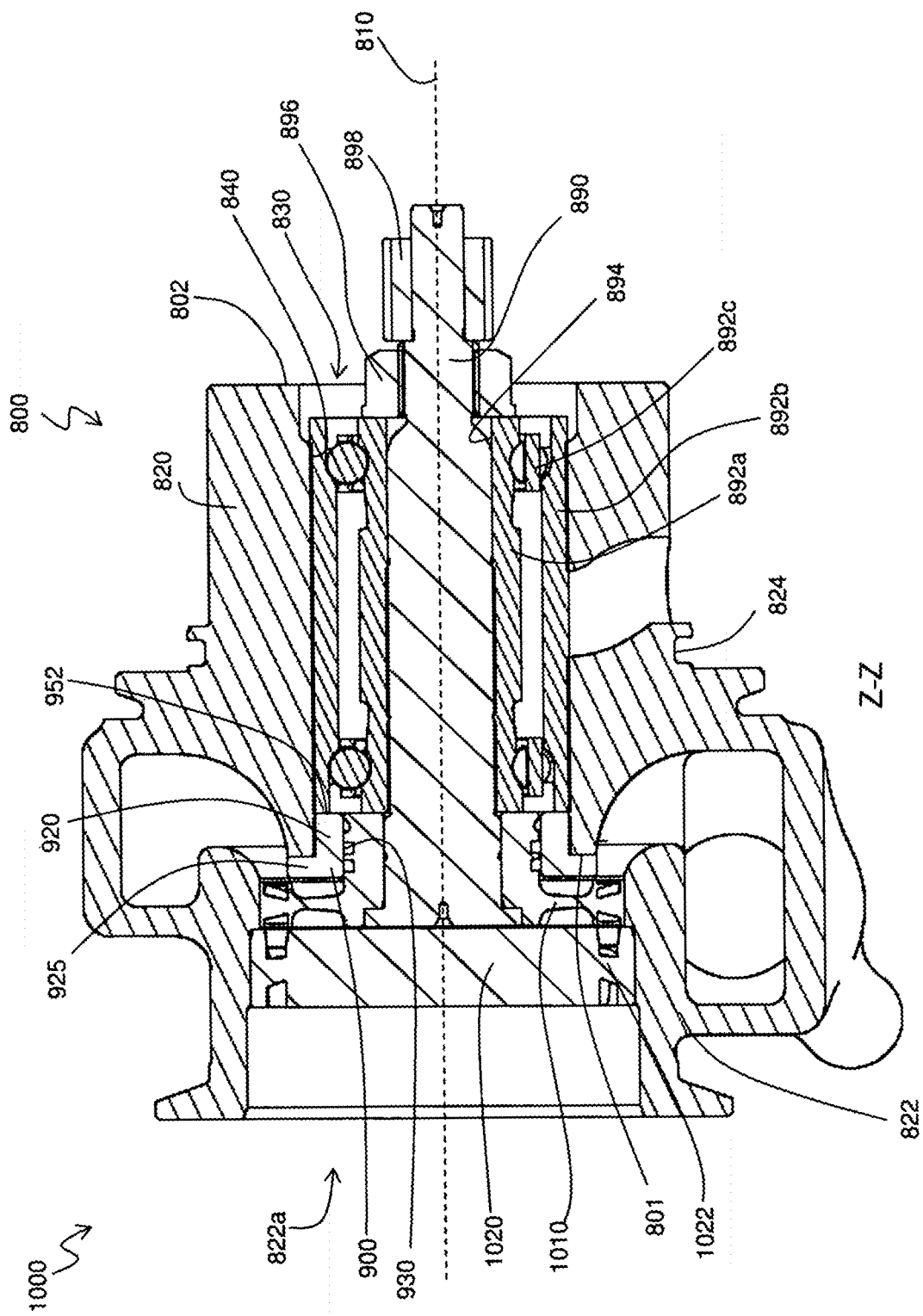

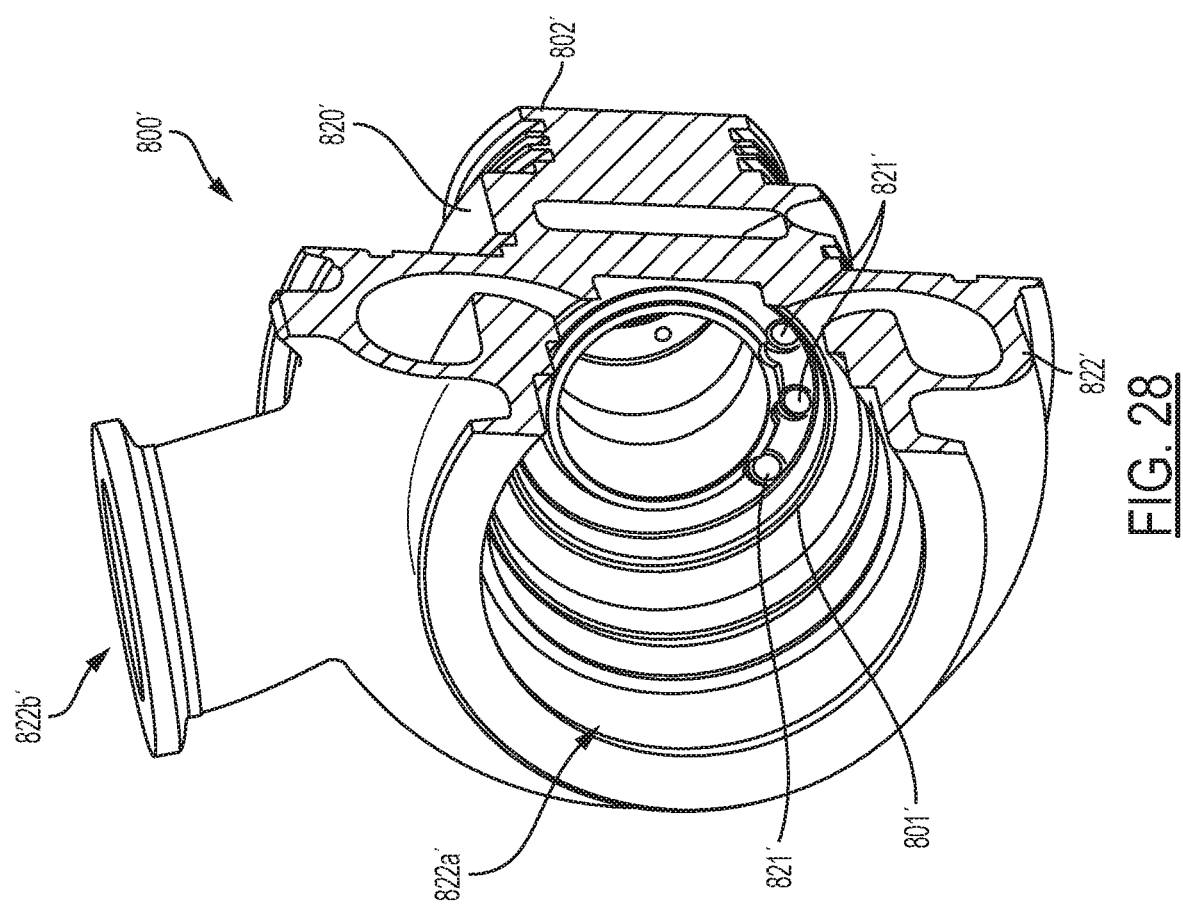

BEARING ASSEMBLY SUPPORT

RELATED APPLICATIONS

The Present application claims priority to U.K. Patent Application Serial No. 143054.4, filed Dec. 23, 2014, the entire disclosure of which being expressly incorporated herein by reference.

FIELD OF THE DISCLOSURE

The present disclosure relates to an apparatus for supporting a bearing assembly, which, in use, is supplied with a lubricant. In particular, the apparatus may form part of a turbomachine, which in turn may form part of an engine assembly.

BACKGROUND OF THE DISCLOSURE

A turbomachine comprises a rotor which is housed within a housing and which is arranged to transfer energy to, or receive energy from, a fluid within the housing. The rotor is connected to a shaft, which is supported by a bearing, allowing the shaft and rotor to rotate within the housing. The bearing is housed within a bearing housing.

Turbomachines may form part of an engine assembly and may comprise, for example, an expansion turbine (for example of a waste heat recovery system), a turbocharger or a turbocompound.

A waste heat recovery system may be used to recover heat from an engine assembly and convert the recovered heat into usable power. Power derived from the waste heat recovery system may be used to generate electricity and/or to augment power output from the internal combustion engine. A conventional waste heat recovery system uses a working fluid, which is pumped around a closed loop. A heat exchanger is used to transfer heat from parts of the engine assembly to the working fluid, which is initially in liquid form, causing the working fluid to vaporise. The working fluid vapour passes to an expansion turbine and drives a turbine wheel of the expansion turbine to rotate. The turbine wheel is mounted on a shaft which is held in a housing. Power is derived from the rotation of the turbine wheel. The working fluid vapour passes from the expansion turbine to a condenser which is configured to cool and condense the working fluid so that it returns to liquid form. The working fluid liquid is then passed to the heat exchanger, where the heat recovery cycle begins again.

Turbochargers are well known devices for supplying air to the intake of an internal combustion engine at pressures above atmospheric (boost pressures). A conventional turbocharger comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power. The turbocharger shaft is supported for rotation by a bearing assembly disposed in a bore in a central bearing housing. The bearing assembly may, for example, comprise a rolling element bearing or a hydrodynamic journal bearing. The bearing housing is connected between the turbine and compressor wheel housings.

Turbomachinery parts may rotate at very high speeds and effective lubrication of the bearings may be important to avoid premature failure through wear or seizure. Therefore, a lubricant, such as oil, is supplied to the bearing housing of a turbomachine via an inlet in the housing. The lubricant may be supplied under pressure from an oil system of an engine assembly and may be distributed via galleries and passages in the housing to the bearings. A drain is provided in the bearing housing to allow the lubricant to drain therefrom. For turbomachines which use oil as the lubricant, the oil may drain under gravity and therefore the drain may be positioned at a point on the housing which, in use, will be the lowest part of the housing.

SUMMARY OF THE DISCLOSURE

The present disclosure provides a support for a bearing assembly that at least partially addresses one or more problems or disadvantages present in the prior art.

According to a first aspect of the present disclosure there is provided a bearing assembly support, comprising a body, the body defining: a thrust surface for contacting an end of a bearing assembly; an aperture extending through the body for receipt of a shaft when supported by the bearing assembly; and at least one passageway along which a lubricant can flow away from the thrust surface during use.

The first aspect is advantageous because the thrust surface may provide axial support for an end of a bearing assembly whilst the at least one passageway allows a lubricant that is supplied to the bearing assembly to flow away from the bearing assembly.

The aperture extending through the body may define an axis of the body. A direction along, or parallel to the axis may be referred to as an axial direction. A direction running to or from the axis and perpendicular to said axis may be referred to as a radial direction.

The or each passageway may be defined by a recess on the thrust surface. The or each recess may extend axially into the thrust surface.

Alternatively, the or each passageway may be defined by a cut away section that extends through the body from the thrust surface to an opposite surface of the body. The cut away section may form an extension of the aperture.

The or each passageway may extend generally radially outwards from the aperture. It will be appreciated that passageways extending in a generally radial direction includes passageways that extend between an inner and an outer radial position, irrespective of the path followed. It will be appreciated that the inner and outer radial positions may not be disposed at the same axial position or the same angular position about the axis of the body.

At least a portion of the or each passageway may extend radially outboard of the thrust surface.

The body may be a housing. The housing may be a bearing housing. For example, the body may comprise a bore for receipt of a bearing assembly and the thrust surface may define an internal end of said bore. The bore may be a stepped bore extending through the body, the stepped bore comprising: a first bore section for receipt of a shaft; a second bore section of different diameter to the first bore section for receipt of a bearing assembly arranged to support the shaft; and a shoulder between the first and second bore sections which defines an internal end of the second bore section, the second bore section defining the aperture, and the shoulder defining the thrust surface.

Alternatively, the body may be an end cap for a bearing housing. The body may comprise a generally cylindrical portion for insertion into a bore of a bearing housing. The body may further comprise a flange surrounding the generally cylindrical portion.

A plurality of passageways may be provided on the body. Each passageway may extend from a different region of the thrust surface. The plurality of passageways may be angularly spaced around an axis of the body. Advantageously, such an arrangement provides two or more circumferential positions to which lubricant may be channeled away from the thrust surface. Where not all of the available passageways are to be used, this provides the bearing assembly support with some redundancy, allowing the bearing assembly support to be disposed in two or more different orientations relative to, for example, a lubricant drain. Often, turbomachinery for engine assemblies may be manufactured separately from other parts of the engine. Typically, one manufacturer may produce and supply turbomachines to one or more engine manufacturers, which produce a range of different engines. Each different engine will provide a different set of constraints and may, for example, require the turbomachines to be orientated differently in use. The provision of a plurality of passageways spaced around the axis allows for a turbomachine with greater flexibility that can be used for a wide range of engines regardless of the particular orientation that the turbomachine must adopt when connected to the engine.

For embodiments comprising a plurality of passageways, all of the passageways may be substantially identical in shape and/or dimension. Alternatively, for embodiments comprising a plurality of passageways, at least one passageway may have a different shape and/or dimension to at least one other passageway.

For embodiments comprising a plurality of passageways, the plurality of passageways may be distributed substantially evenly about an axis of the bearing assembly support. Alternatively, the angular spacing of the passageways may vary around the axis of the bearing assembly support.

The thrust surface may comprise a plurality of sections and the passageways that extend from regions within one of the plurality of sections may be different to the passageways that extend from regions within the or each other section. For example, the shape, dimensions and/or spacing of the passageways that extend from regions within one of the plurality of sections may be different to that of the passageways that extend from regions within the or each other section. Such arrangements wherein the shape, dimensions and/or spacing of the plurality of passageways varies for different sections of the thrust surface may break the symmetry of the thrust surface. Although this may limit the number of orientations that the bearing assembly support may be used in, there may be some advantage in such an arrangement. There may be some advantage in having different passageways, or a different distribution of passageways, for sections of the thrust surface which will be generally close to a lubricant source/drain and other sections of the thrust surface. For example, it may be advantageous to provide larger passageways on sections of the thrust surface which are nearer to a lubricant drain.

The thrust surface may comprise an upper section and a lower section. In use, the apparatus may be orientated so that the upper section is generally higher than the lower section. This distinction between upper and lower sections therefore reduces the number of orientations that the bearing assembly support may be used in if the upper section is required to be generally higher than the lower section but still provides an bearing assembly support with some degree of flexibility. The upper and lower sections may each comprise half of the thrust surface.

Two passageways that extend from regions within a given section may be substantially identical. The shape and/or dimensions of two passageways that extend from regions within two different sections may be different. For example, dimensions of the passageways disposed in the upper section may be smaller than corresponding dimensions of the passageways disposed in the lower section.

The spacing of the plurality of passageways that extend from regions within a given section may be substantially even. The spacing of the plurality of passageways that extend from regions within different sections may be different.

The bearing assembly support may further comprise a lubricant drain bore that connects an outer surface of the bearing assembly support to one of the at least one passageways. For example, the lubricant drain bore may connect the outer surface of the bearing assembly support to the passageway which, in use, is lowest. Such a lubricant drain bore allows fluid to flow from that passageway and away from the bearing assembly support. In some embodiments, more than one drain bore may be provided.

Two or more of the plurality of passageways may be in fluid communication. This communication may be direct or indirect, for example via a passage. One or more passages may connect two or more of the plurality of passageways such that they are in fluid communication. An annular passage may connect each of the plurality of passageways to each other. The annular passage may connect a radially outer part of each of the plurality of passageways. For embodiments comprising a lubricant drain bore, one or more of the passageways that are not aligned with the lubricant drain bore may be in communication with a passageway that does coincide with the lubricant drain bore. The passageway that is aligned with the lubricant drain bore may extend in a purely radial direction and one or more of the remaining passageways may not extend only in a radial direction. Rather, the remaining passageways may be shaped so as to communicate directly with the passageway that is aligned with the drain bore.

Each of the plurality of passageways may have any convenient shape as desired or required. In particular, the or each passageway may have any shape in section through a plane perpendicular to an axis of the housing.

The or each passageway may taper in a radial direction. For example, an angular extent of the or each passageway may taper outwards from a radially inner side of the passageway to a radially outer side of the passageway. For such embodiments, in section through a plane perpendicular to the axis of the bearing assembly support the or each passageway may be generally of the shape of an isosceles trapezium. The isosceles trapezium may have rounded corners. The isosceles trapezium may be formed by a radially inner side, a radially outer side and two radially extending sides. The or each passageway may have any desired angular extent. Alternatively, in some embodiments an angular extent of the or each passageway may taper either inwards from a radially inner side of the passageway to a radially outer side of the passageway.

Additionally or alternatively, an axial extent of the or each passageway may taper either inwards or outwards from a radially inner side of the passageway to a radially outer side of the passageway.

Alternatively, the or each passageway may not taper in a radial direction. For example, in section through a plane perpendicular to the axis of the bearing assembly support the or each passageway may be generally of the shape of a rectangle. The rectangle may be formed by a radially inner side, a radially outer side and two substantially parallel sides extending between the radially inner and radially outer sides. The rectangle may have rounded corners.

In some embodiments, the or each passageway may not extend linearly in the radially direction. In section through a plane perpendicular to the axis of the bearing assembly support, the or each passageway may spiral outwards in a generally radial direction. That is, the angular position of the passageway may vary with radius.

Different shapes and/or configurations of passageway may have different advantages. For example, if an angular extent of the or each passageway tapers outwards from a radially inner side of the passageway to a radially outer side of the passageway, the bearing assembly support may provide more efficient draining of lubricant away from the thrust surface. Alternatively, an embodiment wherein in section through a plane perpendicular to the axis of the bearing assembly support the or each passageway is generally of the shape of a rectangle may be easier to machine, for example by milling the passageways in the thrust surface.

The bearing assembly support may be formed from a metal. The bearing assembly support may be formed by casting, forging or pressing.

According to a second aspect of the disclosure there is provided a turbomachine comprising an bearing assembly support according to the first aspect of the disclosure.

According to a third aspect of the disclosure there is provided a turbomachine comprising: a shaft; a bearing assembly arranged to support the shaft for rotation about an axis; a turbine wheel connected to the shaft; and a bearing assembly support comprising a body, the body defining: a thrust surface in contact with an end of the bearing assembly; an aperture extending through the body for receipt of the shaft; and at least one passageway along which a lubricant can flow away from the bearing assembly during use.

It will be appreciated that the bearing assembly support may be a bearing assembly support according to the first aspect of the disclosure. The turbomachine according to the third aspect may comprise any or all features of the bearing assembly support according to the first aspect of the disclosure.

The bearing assembly may be a rolling element bearing assembly. The rolling element bearing assembly may comprise: an inner race, an outer race and a plurality of rolling elements disposed therebetween. The thrust surface may contact an end of the outer race of the bearing assembly.

The turbomachine may comprise: an expansion turbine; a turbocharger; or a turbocompound.

According to a fourth aspect of the disclosure there is provided a turbomachine comprising: a shaft; a bearing assembly arranged to support the shaft for rotation about an axis; a turbine wheel connected to the shaft; and a bearing assembly support comprising a body, the body defining: a thrust surface in contact with an end surface of the bearing assembly; an aperture extending through the body for receipt of the shaft; wherein at least one passageway is defined by at least one of the body of the bearing support and the bearing assembly, along which a lubricant can flow away from the bearing assembly during use.

It will be appreciated that the bearing assembly support may be a bearing assembly support according to the first aspect of the disclosure. The turbomachine according to the fourth aspect may comprise any or all features of the bearing assembly support according to the first aspect of the disclosure.

The bearing assembly may be a rolling element bearing assembly. The rolling element bearing assembly may comprise: an inner race, an outer race and a plurality of rolling elements disposed therebetween. The thrust surface may contact an end surface of the outer race of the bearing assembly. Said end surface may be generally axially facing and may be generally annular in shape. The passageway may be formed by one or more recesses formed in the end surface of the outer race of the bearing assembly.

The at least one passageway may be defined by the body of the bearing support. Alternatively the at least one passageway may be defined by the bearing assembly. Alternatively, the at least one passageway may be defined by both: the body of the bearing support and the bearing assembly.

The turbomachine may comprise: an expansion turbine; a turbocharger; or a turbocompound.

According to a fifth aspect of the disclosure there is provided an engine assembly comprising a turbomachine according to the second aspect of the disclosure, a turbomachine according to the third aspect of the disclosure, or a turbomachine according to the fourth aspect of the disclosure.

According to a sixth aspect of the disclosure there is provided a method of manufacturing a housing with a lubricant drain, said method comprising the steps of: providing a bearing assembly support according to the first aspect of the disclosure as part of the housing, wherein a plurality of passageways is formed in the body, the plurality of passageways being angularly spaced around an axis of the body; selecting one or more of the plurality of passageways; and forming a drain bore in the housing, wherein said drain bore connects the one or more selected passageways to an outer surface of the housing.

Advantageously, such a method involves the formation of a housing, which, in use, can be disposed in two or more different orientations relative to, for example, a lubricant sink. Once an orientation has been chosen, one or more of the plurality of passageways is/are selected and the drain bore is formed, allowing the chosen one or more passageways to be connected to the lubricant sink.

The drain bore may be formed when the bearing assembly support is initially manufactured or may be retrofit in the body of the bearing assembly support at a later date.

The at least one passageway may be formed by casting, forging or pressing. The drain bore may be machined.

The selection of one or more of the plurality of passageways may be dependent upon how the housing will be orientated in use. For example, the lowest passageway may be selected.

Various aspects and features of the disclosure set out above or below may be combined with various other aspects and features of the disclosure as will be readily apparent to the skilled person.

BRIEF DESCRIPTION OF THE DRAWINGS

Embodiments of the present disclosure will now be described, by way of example only, with reference to the accompanying Figures, of which:

FIG. 5 is a sectional view of a recess of the first embodiment of the housing of the expansion turbine of FIG. 1 through the line W-W of FIG. 3;

FIG. 20 is a cross sectional view of the expansion turbine of FIG. 18 through the line Z-Z;

FIG. 28 is a partial cross sectional perspective view of a housing that forms part of the expansion turbine of FIG. 24;

DETAILED DESCRIPTION OF EMBODIMENTS OF THE DISCLOSURE

Figure 1:
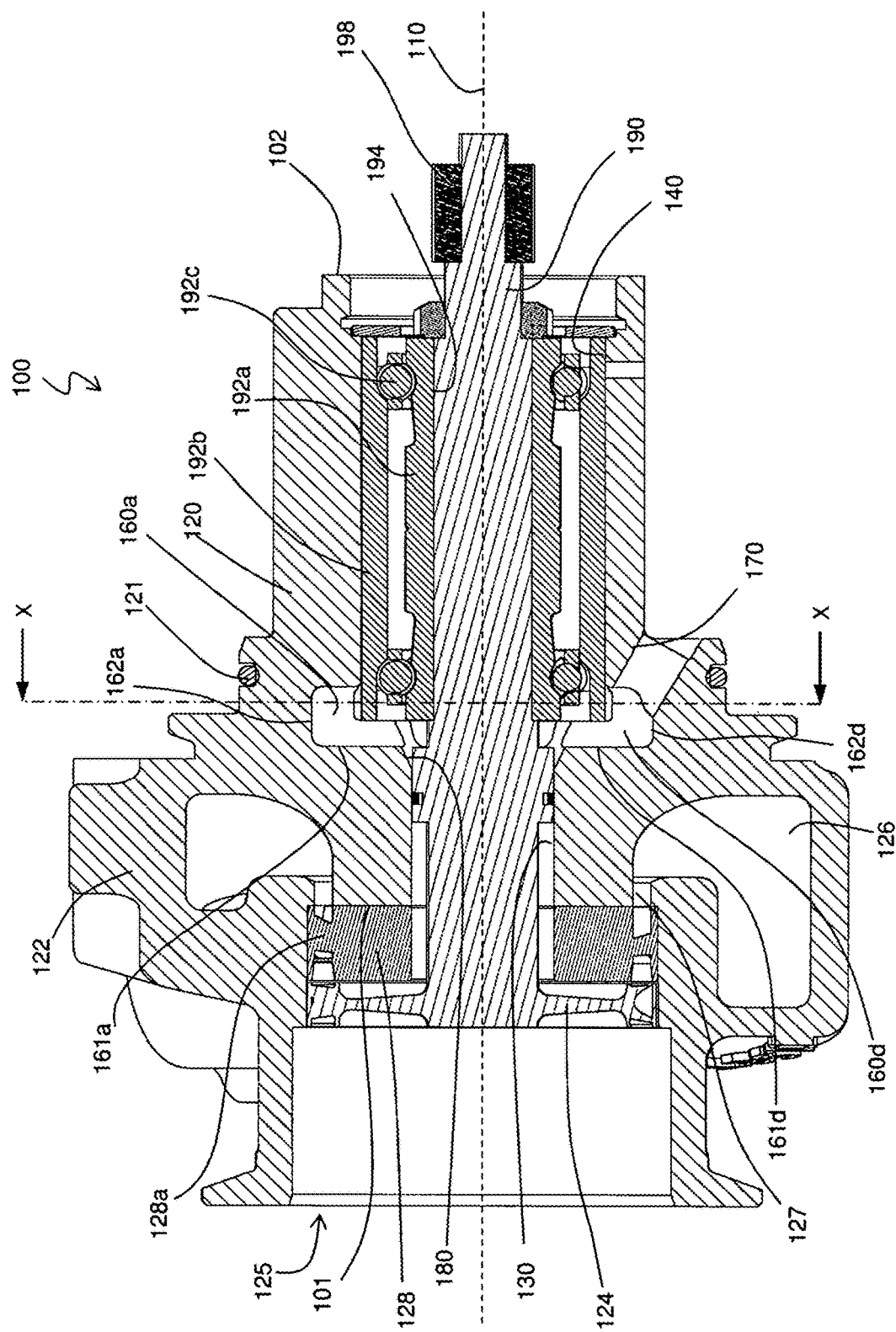
FIG. 1 is a cross sectional view of an expansion turbine including a housing according to the present disclosure.
Figure 2:
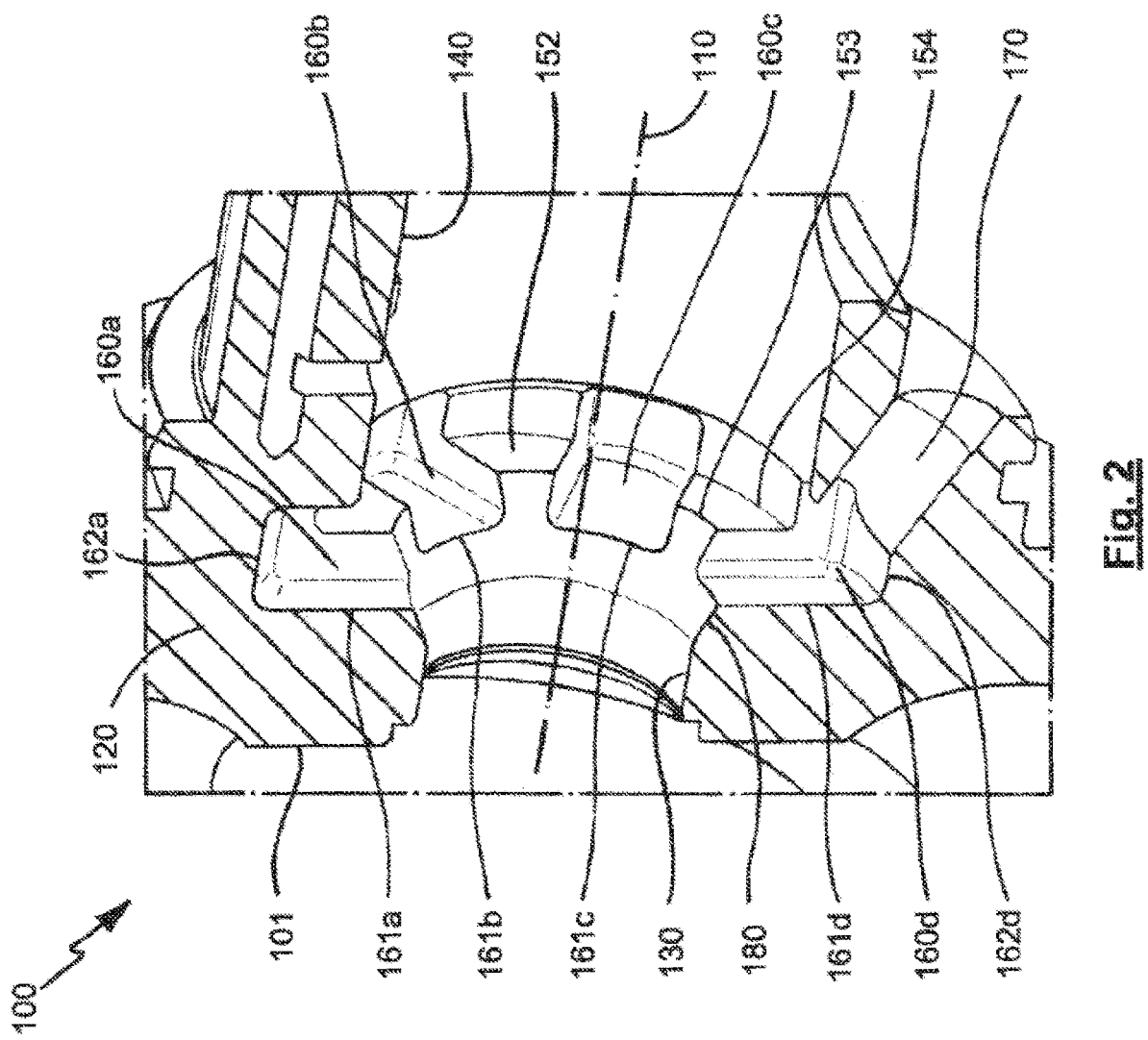
FIG. 2 is a perspective view of a partial cross section of a part of a first embodiment of the housing of the expansion turbine of FIG. 1.
Figure 4:
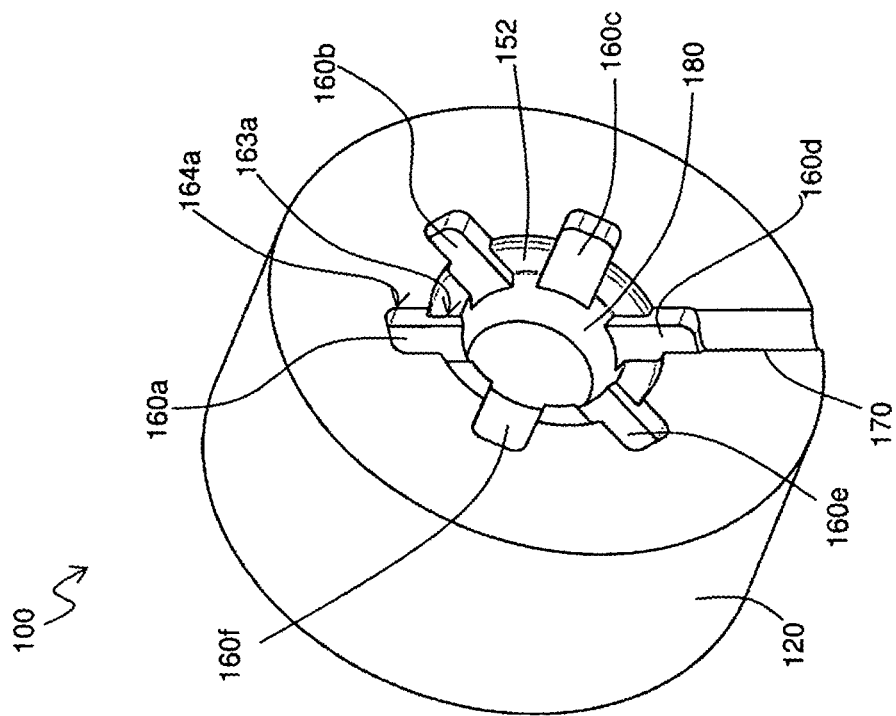
FIG. 4 is a perspective view of the partial cross sectional view shown in FIG. 3.
Figure 3:
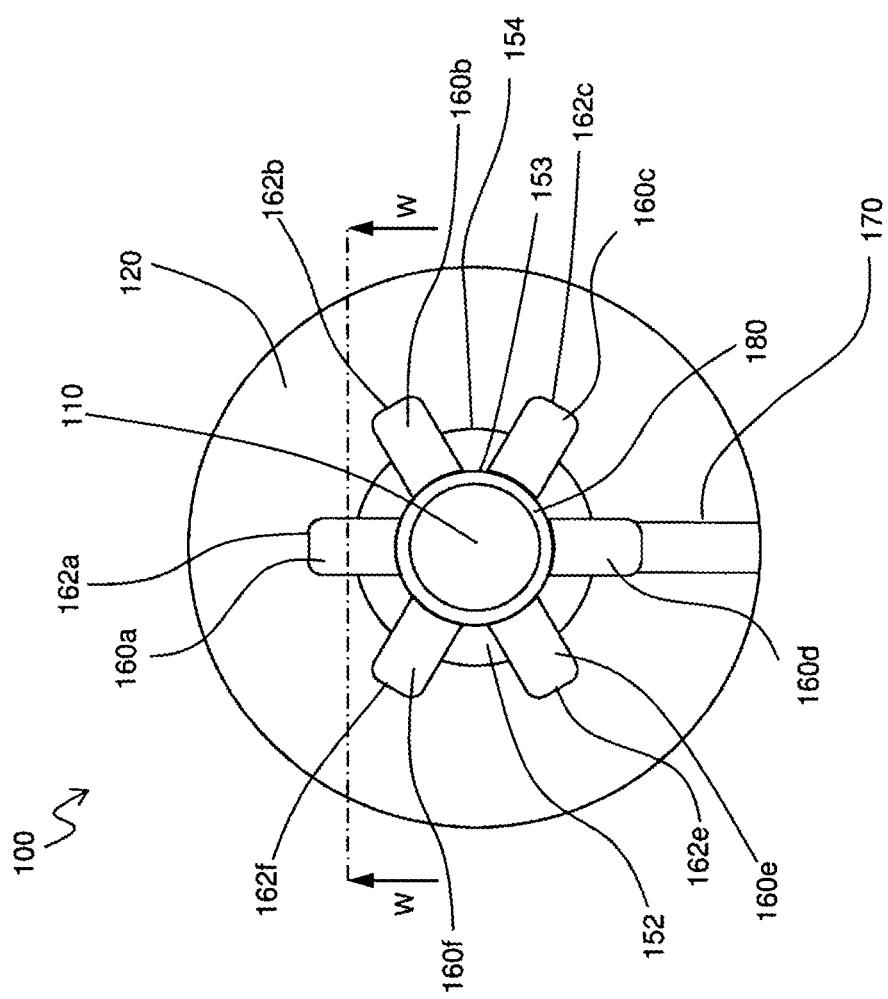
FIG. 3 is a partial cross sectional view of the first embodiment of the housing of the expansion turbine of FIG. 1 through the line X-X.

An apparatus for supporting a bearing assembly according to first embodiment of the disclosure is illustrated in FIGS. 1 to 4. The apparatus is of the form of a housing 100, which forms part of an expansion turbine. The expansion turbine may, for example, form part of a waste heat recovery system of an engine assembly. FIG. 1 is a cross sectional view of an expansion turbine including housing 100. FIG. 2 is a perspective view of a partial cross section of a part of the housing 100 of FIG. 1. FIG. 3 is a partial cross sectional view of the housing 100 of FIG. 1 through the line X-X. FIG. 4 is a perspective view of the partial cross section shown in FIG. 3. Housing 100 comprises a generally cylindrical body 120 formed by a curved wall arranged around an axis 110.

A stepped bore, comprising first and second bore sections 130, 140 extends through the body 120 between two opposed ends 101, 102 of the body 120. The first bore section 130 is generally cylindrical and extends into the body 120 from a first end 101 of the body 120 for receipt of a shaft 190 (see FIG. 1). The second bore section 140 is generally cylindrical and extends into the body 120 from a second end 102 of the body 120 for receipt of a bearing assembly 192 (see FIG. 1). The first and second bore sections 130, 140 are substantially coaxial, the axis 110 of the housing 100 being common to both the first and second bore sections 130, 140. A diameter of the second bore section 140 is larger than a diameter of the first bore section 130 and first bore section 130 opens out into the second bore section 140.

A direction along, or parallel to the axis 110 may be referred to as an axial direction. A direction running to or from the axis 110 and perpendicular to said axis 110 may be referred to as a radial direction.

The stepped bore that extends through the body 120 of the housing 100 defines a shoulder between the first and section bore sections 130, 140. The shoulder defines a thrust surface 152 which is generally perpendicular to the axis 110 and defines an internal axial end of the second bore section 140. In use, thrust surface 152 is suitable for contacting an end of a bearing assembly, as now described.

Referring to FIG. 2, in use, a generally cylindrical bearing assembly 192 is inserted into the second bore section 140 through the second end of the housing 100 until the bearing assembly 192 abuts the thrust surface 152. An inner diameter of the second bore section 140 substantially matches an outer diameter of the bearing assembly 192 such that it is a close fit within the second bore section 140. In this embodiment, the bearing assembly 192 is a rolling element assembly, comprising an inner race 192a, an outer race 192b and a plurality of rolling elements 192c disposed therebetween. It will be appreciated that other types of bearing assembly may alternatively be used. The bearing assembly 192 is arranged to support a shaft 190 for rotation about the axis 110. For this purpose, a central bore 194 extends through the inner race 192a for receipt of the shaft 190, which, in use, is generally aligned with and a similar size to the first bore section 130. First bore section 130 defines an axially extending aperture extending through the body 120 of housing 100 for receipt of the shaft 190. In use, the shaft 190 is received within the central bore 194 of the bearing assembly 192 defined by the inner race 192a and extends through the first bore section 130 out of the body 120.

The radial extent of the thrust surface 152 is not given by the difference in the radii of the first and second bore sections 130, 140. Rather, a radially tapering section 180 is provided between the first bore section 130 and the thrust surface 152.

Six recesses 160a-160f are formed in the body 120 of the housing 100. Each of the six recesses 160a-160f defines a passageway along which a lubricant can flow away from the thrust surface 152. As can be seen most clearly in FIGS. 2 and 4, each of the six recesses 160a-160f extends into the shoulder, extending axially away from the thrust surface 152 towards an inner wall 161a-161f of the recess 160a-160f. Each of the recesses 160a-160f also extends radially, defining a fluid conduit along which a lubricant can flow in a generally radial direction. The recesses 160a-160f extend radially from an inner radial edge 153 of the thrust surface 152, through an outer radial edge 154 of the thrust surface 152 and radially outboard of the second bore section 140 to a radially outer wall 162a-162f formed in the body 120.

As explained above, when a bearing assembly 192 is received within the second bore section 140, it is axially constrained by the thrust surface 152. That is, the housing 120 acts to support the bearing assembly 192. The six recesses 160a-160f break the thrust surface 152 into six portions. The recesses 160a-160f define six channels through which a lubricant that is supplied to the bearing assembly may flow away from the bearing assembly 192. Therefore, advantageously, the housing 100 provides a thrust surface 152 that will provide axial support for the bearing assembly around its circumference whilst providing six channels through which a lubricant that is supplied to the bearing assembly may drain away from the bearing assembly 192.

A drain bore 170 extends from an outer surface of the body 120 of the housing 100 to the second bore section 140. The drain bore 170 is aligned with one of the recesses 160a-160f in the body 120 of the housing 100 such that drain bore 170 connects said one of the recesses 160a-160f to the outer surface of the body 120. The drain bore 170 may be disposed at an oblique angle to the axis 110 of the housing 100 such that it extends both radially and axially (for example as shown in FIGS. 1 and 2). Alternatively, the drain bore 170 may only extend radially (for example as shown in FIGS. 3 and 4).

In use, the bearing assembly will be provided with a supply of lubricant. For this purpose, the housing 100 may comprise a lubricant inlet bore (not shown) in the conventional manner. For embodiments wherein the housing 100 forms part of a waste heat recovery system comprising an organic Rankine cycle (ORC), the lubricant may comprise the working fluid of the ORC. Alternatively, the lubricant may comprise oil. For embodiments wherein the lubricant is the working fluid of an ORC, the lubricant may enter the housing 100 as a liquid and may exit the housing 100 as a vapour. Therefore, for such embodiments, the drain bore 170 may be provided at an angular position which, in use, coincides with, or is close to, a highest point of the housing 100. For embodiments wherein the lubricant is oil, the drain bore 170 may be provided at an angular position which, in use, coincides with, or is close to, a lowest point of the housing 100.

In this embodiment, the recesses 160a-160f are evenly distributed around the axis 110. Further, each of the recesses 160a-160f is substantially the same size and shape.

As can be seen in FIG. 3, in section through a plane perpendicular to the axis 110 of the housing 100, each of the recesses is generally rectangular in shape, with rounded corners (formed by fillet radii). In this plane, each recess is formed by a radially inner side, a radially outer wall 161a-161f and two substantially parallel sides extending between the radially inner side and the radially outer wall 161a-161f. As can be seen in FIG. 4, in section through a radial plane that passes through the recess, each of the recesses is generally L shaped, with rounded corners. Taking recess 160a as an example, the L shape is formed by a first portion 163a that extends axially into the thrust surface 152 and a second portion 164a that extends radially into the curved wall of the body 120. The axial extent of the second portion 164a is greater than the axial extent of the first portion 163a, such that in section through a radial plane that passes through it, each recess is generally L shaped.

At the first end 101 of body 120, a turbine housing 122 is formed. Turbine housing 122 may be integrally formed with body 120. Alternatively, turbine housing 122 and body 120 may be formed separately and connected in any suitable fashion. Turbine housing 122 houses a turbine wheel 124, which is connected to a portion of the shaft 190 which extends axially outboard of the first end 101 of housing 120. Turbine wheel 124 may be integrally formed with shaft 190 or, alternatively, turbine wheel 124 and shaft 190 may be formed separately and connected in any suitable fashion.

A gear wheel 198 is mounted onto a portion of the shaft 190 which extends axially outboard of the second end 102 of housing 120 for rotation about axis 110. The expansion turbine may form part of a turbine generator and the gear wheel 198 may be used to drive the rotor of an electrical generator.

In use, a working fluid flows through the turbine housing 122 between an inlet (not shown) and an outlet 125. Fluid flows from the inlet into a volute 126, which directs the fluid through an annular passageway 127 towards the turbine wheel 124, causing turbine wheel 124 and shaft 190 to rotate. A stator nozzle 128 is disposed upstream of the turbine wheel 124. Stator nozzle 128 comprises a plurality of guide vanes 128a that are arranged to direct the flow of working fluid from annular passageway 127 to the turbine wheel 124. Shaft 190 acts to transmit torque to gear wheel 198, causing it to rotate.

At the second end 102 of body 120, a gearing housing (not shown) may be formed. The gearing housing may house gear wheel 198 and one or more other gear wheels (no shown) that are arranged to engage with gear wheel 198. Gearing housing may be of the form of a cap provided over the second end 102 of body 120. In particular, the gearing housing may be provided with a generally cylindrical bore for receipt of at least part of body 120. An outer dimension of body 120 may substantially match an inner dimension of the bore in the gearing housing and one or more O-rings 121 may be provided in annular grooves on an outer surface of body 120 to seal body 120 to gearing housing.

FIG. 5 is a sectional view of a recess 160a of the housing 100 along the line W-W of FIG. 3. In this section, the recess 160a has a generally rectangular profile. In an alternative embodiment, the recesses may define fillet radii such that in section along the line W-W, the recess has a generally rectangular profile with rounded corners.

Various different embodiments of a housing for a bearing assembly according to the disclosure are now described. In particular, various different shapes, sizes and distributions of recesses around axis 110 are now described. Features which are substantially identical to those of the first embodiment 100 share common reference numerals therewith. Only the differences between each of the following embodiments and the first embodiment 100 will be described in detail below.

Figure 7:
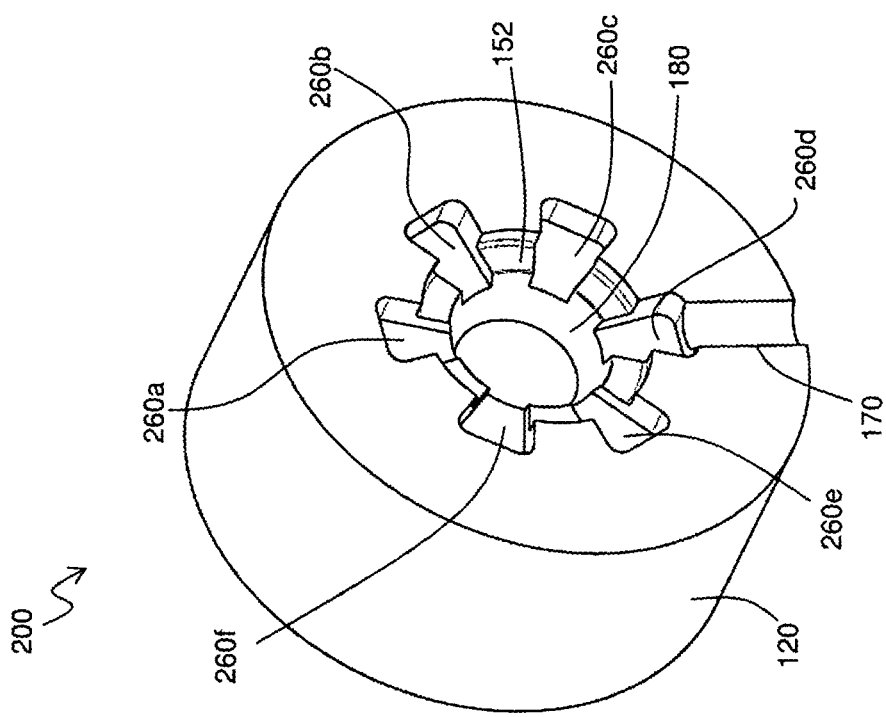
FIG. 7 is a perspective view of the partial cross sectional view shown in FIG. 6.
Figure 6:
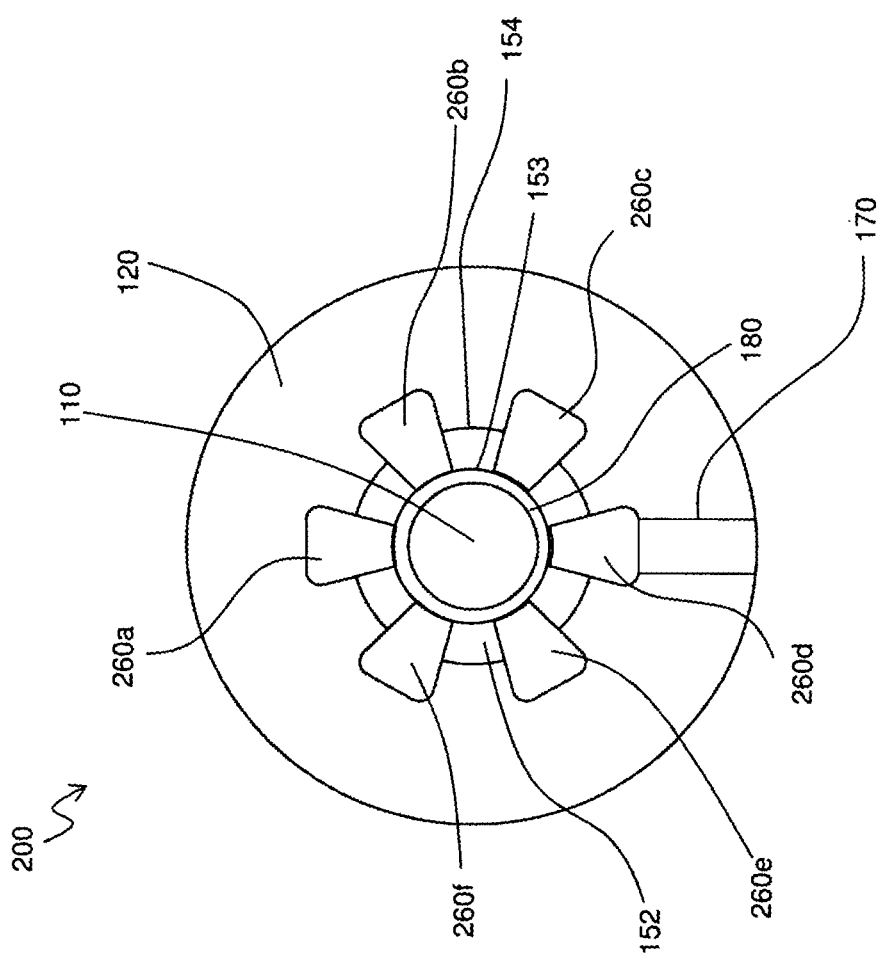
FIG. 6 is a partial cross sectional view (through the line X-X) of a second embodiment of a housing which may form part of the expansion turbine of FIG. 1.

Referring to FIGS. 6 and 7, a second embodiment of a housing 200 for a bearing assembly according to the disclosure is illustrated.

As with the first embodiment 100, six recesses 260a-260f are formed in the body 120 of the housing 200, the six recesses being evenly distributed about axis 110. However, in section through a plane perpendicular to the axis 110 of the housing 100 the recesses 260a-260f of the second embodiment 200 are a different shape to the recesses 160a-160f of the first embodiment 100.

In section through a plane perpendicular to the axis 110 of the housing 100, each of the recesses 260a-260f is generally of the shape of an isosceles trapezium, with rounded corners. The isosceles trapezium is formed by a radially inner side, a radially outer wall 261a-261f and two generally radially extending walls. In a plane perpendicular to the axis 110 of the housing 200, each recess is arranged so that moving from the radially inner wall to the radially outer wall, it tapers outwards.

Figure 9:
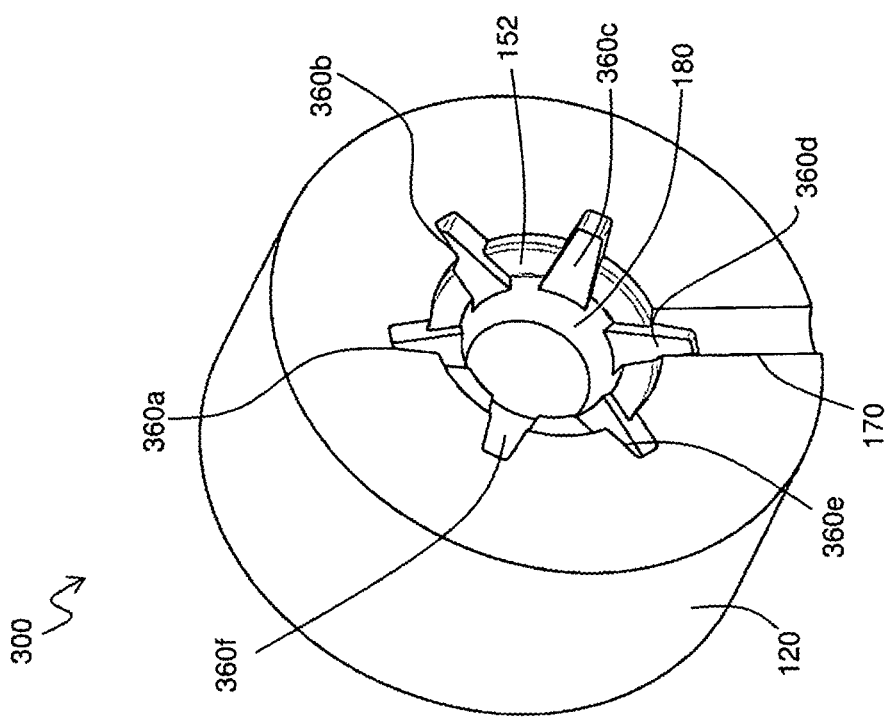
FIG. 9 is a perspective view of the partial cross sectional view shown in FIG. 8.
Figure 8:
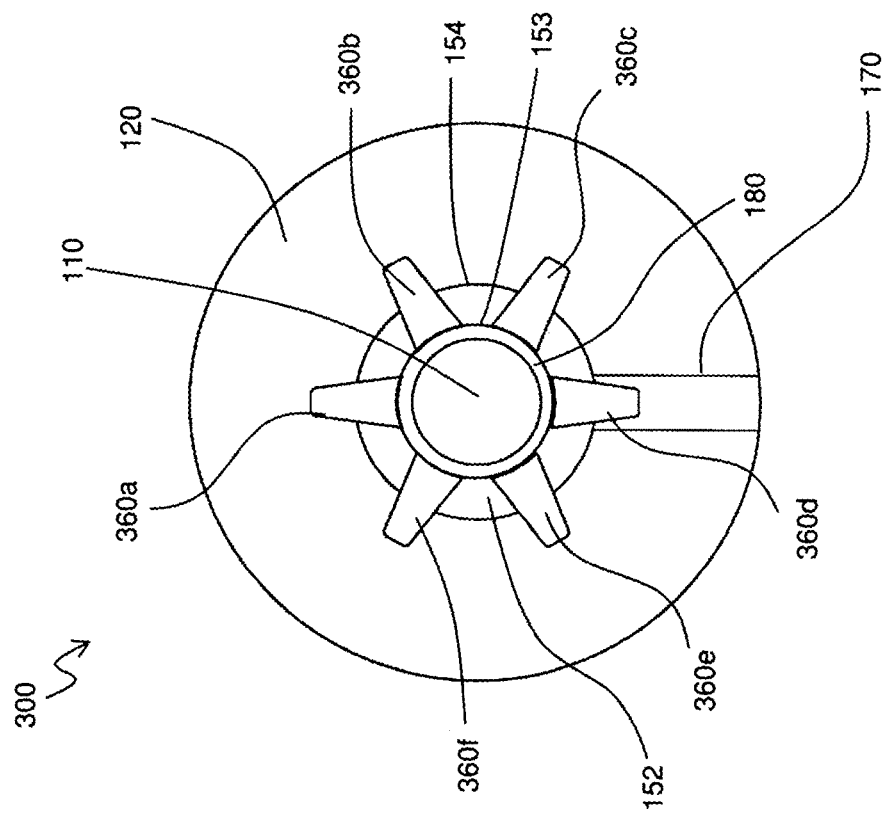
FIG. 8 is a partial cross sectional view (through the line X-X) of a third embodiment of a housing which may form part of the expansion turbine of FIG. 1.

Referring to FIGS. 8 and 9 a third embodiment of a housing 300 for a bearing assembly according to the disclosure is illustrated.

As with the second embodiment 200, six recesses 360a-360f are formed in the body 120 of the housing 300. Similarly to the second embodiment 200, in section through a plane perpendicular to the axis 110 of the housing 300, each of the recesses is generally of the shape of an isosceles trapezium, with rounded corners. The recesses 360a-360f of the third embodiment 300 taper radially but in the opposite sense to the recesses 260a-260f of the second embodiment 200. Accordingly, each recess 360a-360f of the third embodiment 300 is arranged so that moving from a radially inner wall to a radially outer wall, it tapers inwards.

Figure 11:
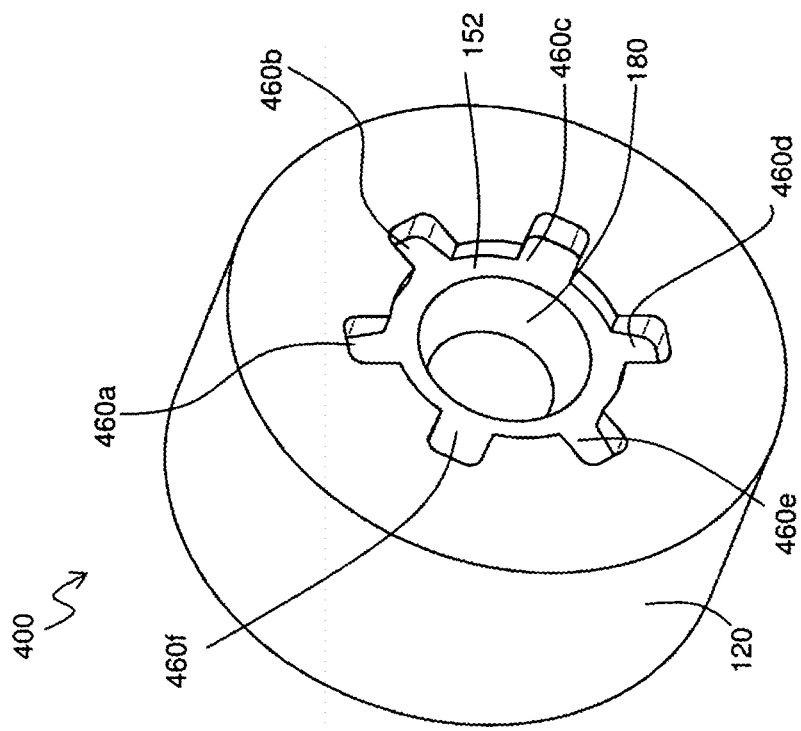
FIG. 11 is a perspective view of a partial cross section (through the line X-X) of the housing shown in FIG. 10.
Figure 10:
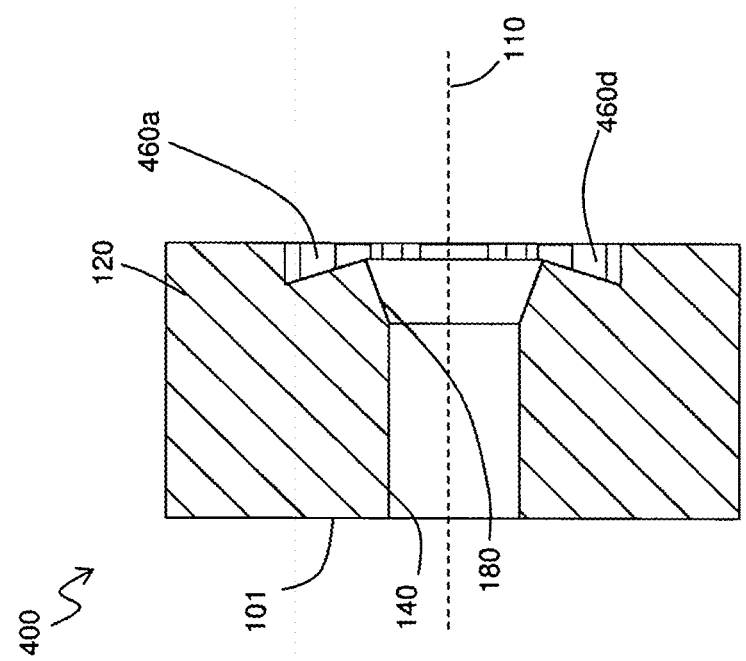
FIG. 10 is a cross sectional view of a portion of a fourth embodiment of a housing which may form part of the expansion turbine of FIG. 1.

Referring to FIGS. 10 and 11 a fourth embodiment of a housing 400 for a bearing assembly according to the disclosure is illustrated.

As with the first embodiment 100, six recesses 460a-460f are formed in the body 120 of the housing 400, the six recesses being evenly distributed about axis 110. An axial extent of each recess 460a-460f tapers outwards from a radially inner side of the recess 460a-460f to a radially outer side of the recess 460a-460f That is, as best seen in FIG. 10, the axial extent of each recess 860a-860f at its radially inner side is smaller than the axial extent of each recess 860a-860f at its radially outer side.

Figure 13:
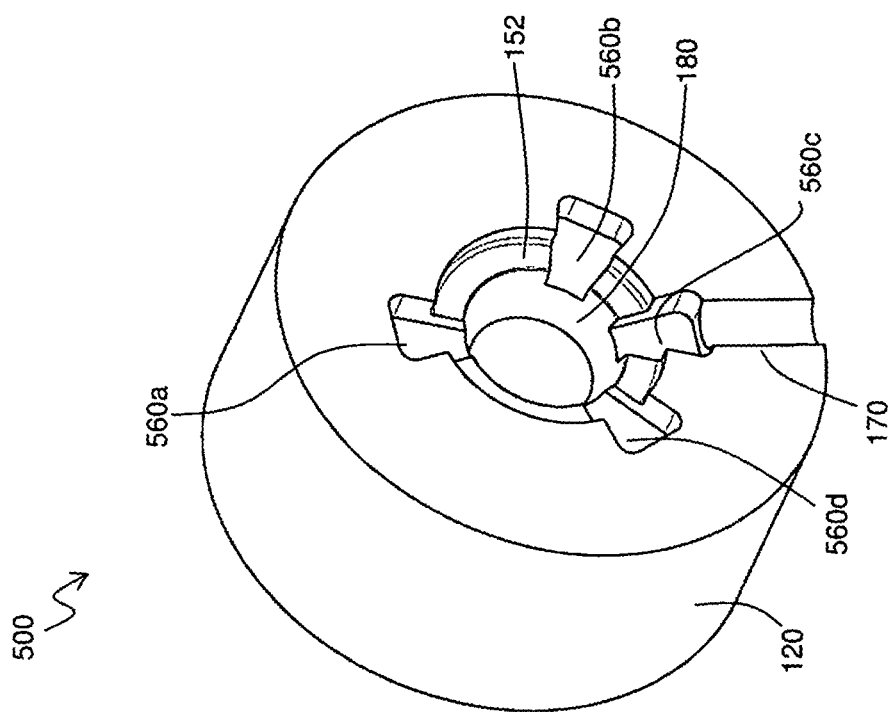
FIG. 13 is a perspective view of the partial cross sectional view shown in FIG. 12.
Figure 12:
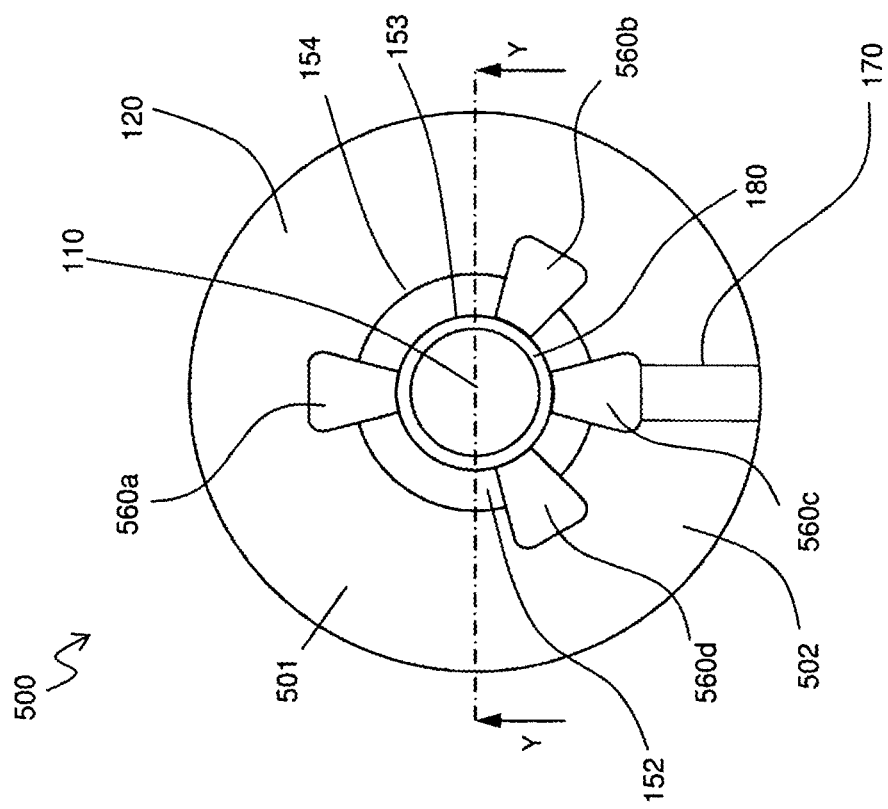
FIG. 12 is a partial cross sectional view (through the line X-X) of a fifth embodiment of a housing which may form part of the expansion turbine of FIG. 1.

Referring to FIGS. 12 and 13 a fifth embodiment of a housing 500 for a bearing assembly according to the disclosure is illustrated.

Four recesses 560a-560d are formed in the body 120 of the housing 500. In this embodiment 500, the recesses 560a-560d are not distributed evenly around the axis 110. The distribution of the four recesses 560a-560d around the axis 110 is similar to that of the recesses 260a-260f of the second embodiment 200 but with two of the recesses 260b, 260f absent.

In a plane perpendicular to the axis 110 of the housing 500, the housing 500 may be considered to comprise an upper section 501 and a lower section 502, the upper and lower sections being divided by the line Y-Y in FIG. 12. One of the recesses 560a is disposed in the upper section 501 and three of the recesses 560b-560d are disposed in the lower section 502. In use, the housing 500 may be orientated so that the upper section 501 is generally higher than the lower section 502. The housing 500 may be disposed so that, in use, the oil drain bore 170 is the lowest part of the housing 500.

Figure 15:
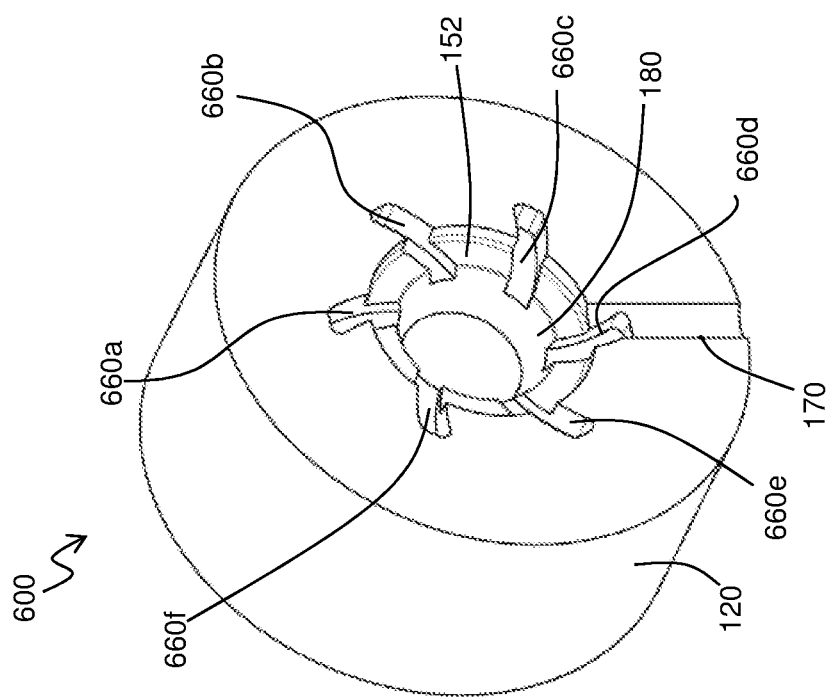
FIG. 15 is a perspective view of the partial cross sectional view shown in FIG. 14.
Figure 14:
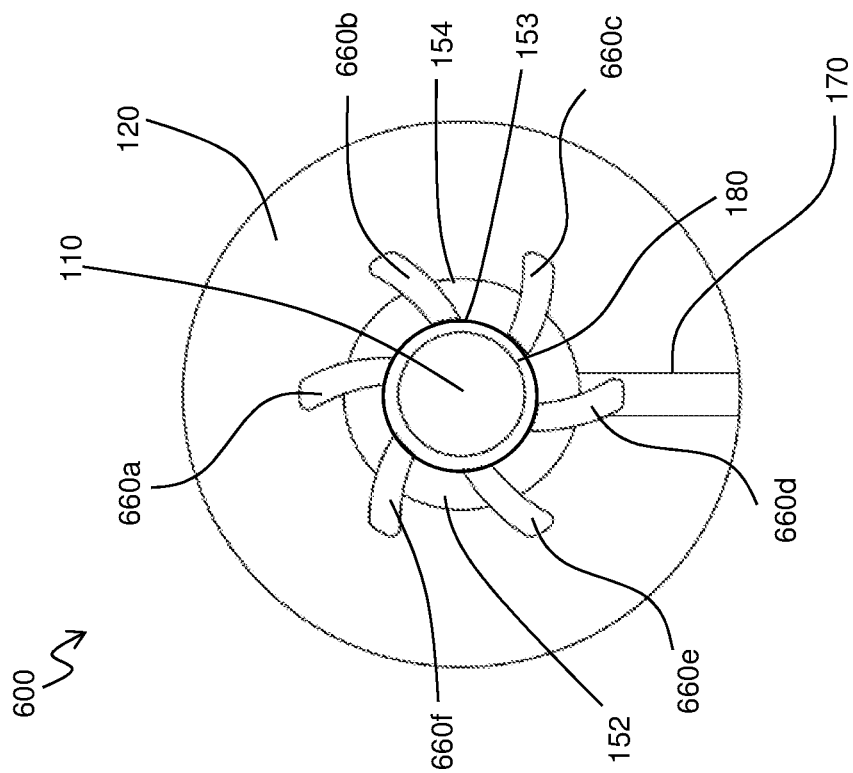
FIG. 14 is a partial cross sectional view (through the line X-X) of a sixth embodiment of a housing which may form part of the expansion turbine of FIG. 1.

Referring to FIGS. 14 and 15 a sixth embodiment of a housing 600 for a bearing assembly according to the disclosure is illustrated.

As with the first embodiment 100, six recesses 660a-660f are formed in the body 120 of the housing 600, distributed evenly around the axis 110. As with the first embodiment 100, each of the six recesses 660a-660f extends generally radially from an inner radial edge 153 of the thrust surface 152, through an outer radial edge 154 of the thrust surface 152 and radially outboard of the second bore section 140 to a radially outer wall 662a-662f formed in the body 120. However, the six recesses 660a-660f do not extend in a linear radial direction. Rather, as shown in FIG. 14, in a plane perpendicular to the axis 110 of the housing 600, the recesses 660a-660f spiral outwards from the inner radial edge 153 of the thrust surface 152 to the radially outer wall 662a-662f.

Figure 17:
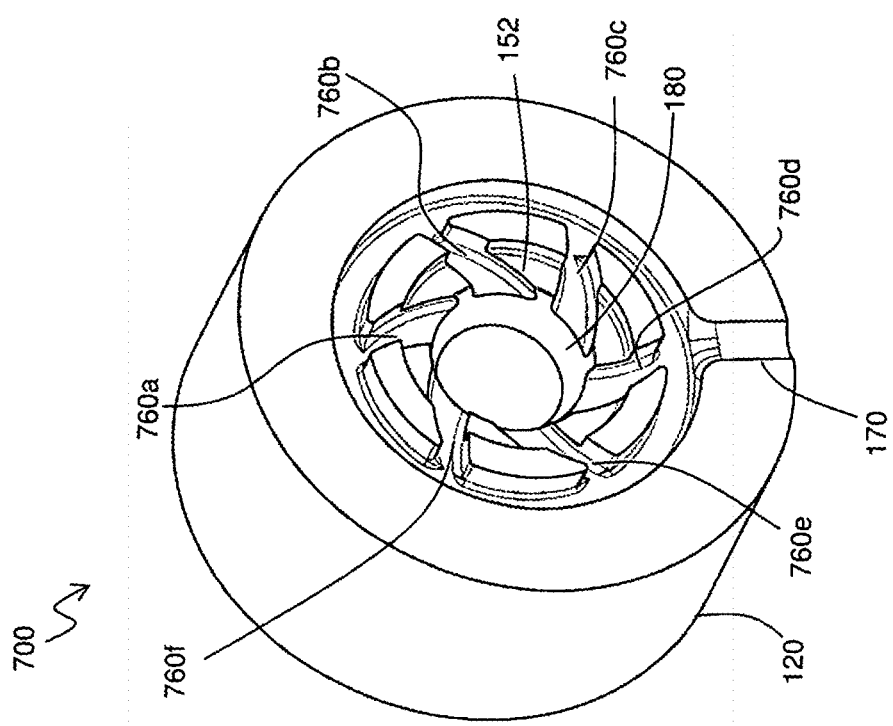
FIG. 17 is a perspective view of the partial cross sectional view shown in FIG. 16.
Figure 16:
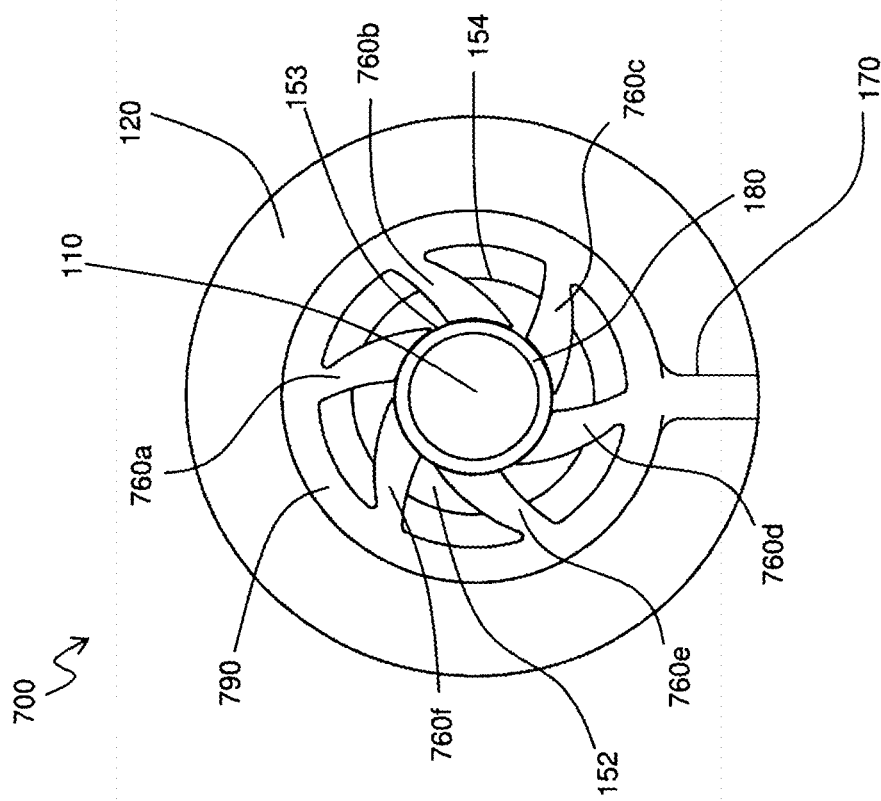
FIG. 16 is a partial cross sectional view (through the line X-X) of a seventh embodiment of a housing which may form part of the expansion turbine of FIG. 1.

Referring to FIGS. 16 and 17 a seventh embodiment of a housing 700 for a bearing assembly according to the disclosure is illustrated.

Six recesses 760a-760f are formed in the body 120 of the housing 700. As with the sixth embodiment 600, the recesses 760a-760f are distributed evenly around the axis 110. Further, in a plane perpendicular to the axis 110 of the housing 700, the recesses 760a-760f spiral outwards from the inner radial edge 153 of the thrust surface 152 to the radially outer end of the recesses 760a-760f.

In addition, an annular passage 790 is formed in the body 120 of the housing 700. An inner radius of the annular passage 790 coincides with a radially outer end of each of the recesses 760a-760f. Therefore the annular passage 790 connects all of the recesses 760a-760f together via their radially outer ends. This allows lubricant that flows along any of the recesses 760a-760c, 760e-760f that is not adjacent to the oil drain bore 170 to drain through annular passage 790 towards the oil drain bore 170. Advantageously, this can prevent build-up of lubricant within the recesses 760a-760c, 760e-760f that are not adjacent to the oil drain bore 170.

The above described housings 100, 200, 300, 400, 500, 600, 700 according to embodiments of the disclosure may be formed from any suitable material and by any suitable process. The housings may be formed from a metal such as, for example, iron, steel, aluminium or magnesium. The housings may be formed by casting, forging or pressing.

In some embodiments, the housings may be formed by casting. The recesses (and, optionally, the annular passage) may be cast using a suitable removable core such as, for example, a sand core.

The drain bore 170 may be formed as part of the casting process.

Alternatively, in some embodiments, the drain bore 170 may be machined in the housing after the casting process. In one production process according to an embodiment of the disclosure, the housing is formed by: (i) first forming a housing (including a plurality of recesses) substantially as described above but without a drain bore; (ii) selecting one or more of the recesses; and (iii) forming a drain bore in a wall of the housing that connects the selected one or more recesses to an outer surface of the housing. Advantageously, such a method allows for the formation of a housing, which, in use, can be disposed in two or more different orientations relative to, for example, a lubricant drain. Once an orientation has been chosen, one of the plurality of recesses is selected and the drain bore is formed, allowing that region to be connected to a drain. The selection of one of the plurality of recesses in the housing may be dependent upon how the housing will be orientated in use. For example, the lowest recess may be selected.

There may be any time period between step (i) of forming a housing according to an embodiment of the disclosure and steps (ii) and (iii) of selecting one or more of the plurality of recesses and forming a drain bore in the body of the housing. For example, the drain bore may be formed when the housing is first manufactured, formed once the engine-type with which it is to be used has been identified or it may be retrofit in the body of the housing when it is necessary to change the orientation of the turbomachine after being used for a period of time.

It will be apparent to the skilled person that alternative embodiments may employ different shapes, sizes and angular distributions of recesses to the above described embodiments. Further, although all of the recesses for any given one of the above described embodiments are substantially the same size and shape, in alternative embodiments a single housing may comprise two or more recesses with different sizes and/or shapes. For example, the recess that is aligned with the oil drain bore may be of a different size and/or shape to the remaining recesses.

One or more of the recesses that are not aligned with the oil drain bore may be in communication with the recess that does coincide with the oil drain bore. For recesses that extend in a generally radial direction, such communication may be via an annular passage, as in the embodiment 700 of FIGS. 16 and 17. Whilst the annular passage 790 of that embodiment 700 connects a radially outer part of each of the recesses, the skilled person would appreciate that the annular passage may alternatively connect another part of each of the recesses. Although the recess that is aligned with the oil drain bore may extend in a generally radial direction, the remaining recesses may not extend in a generally radial direction. Rather, the remaining recesses may be shaped so as to communicate directly with the recess that is aligned with the oil drain bore.

One or more features of any of the above described embodiments may be combined with one or more features of any other of the above described embodiments.

Two further embodiments of apparatus for supporting a bearing assembly are now described with reference to FIGS. 18 to 23. An apparatus for supporting a bearing assembly according to an eighth embodiment of the disclosure is of the form of a housing 800, whereas an apparatus for supporting a bearing assembly according to a ninth embodiment of the disclosure is of the form of an end cap 900 for housing 800.

Figure 18:
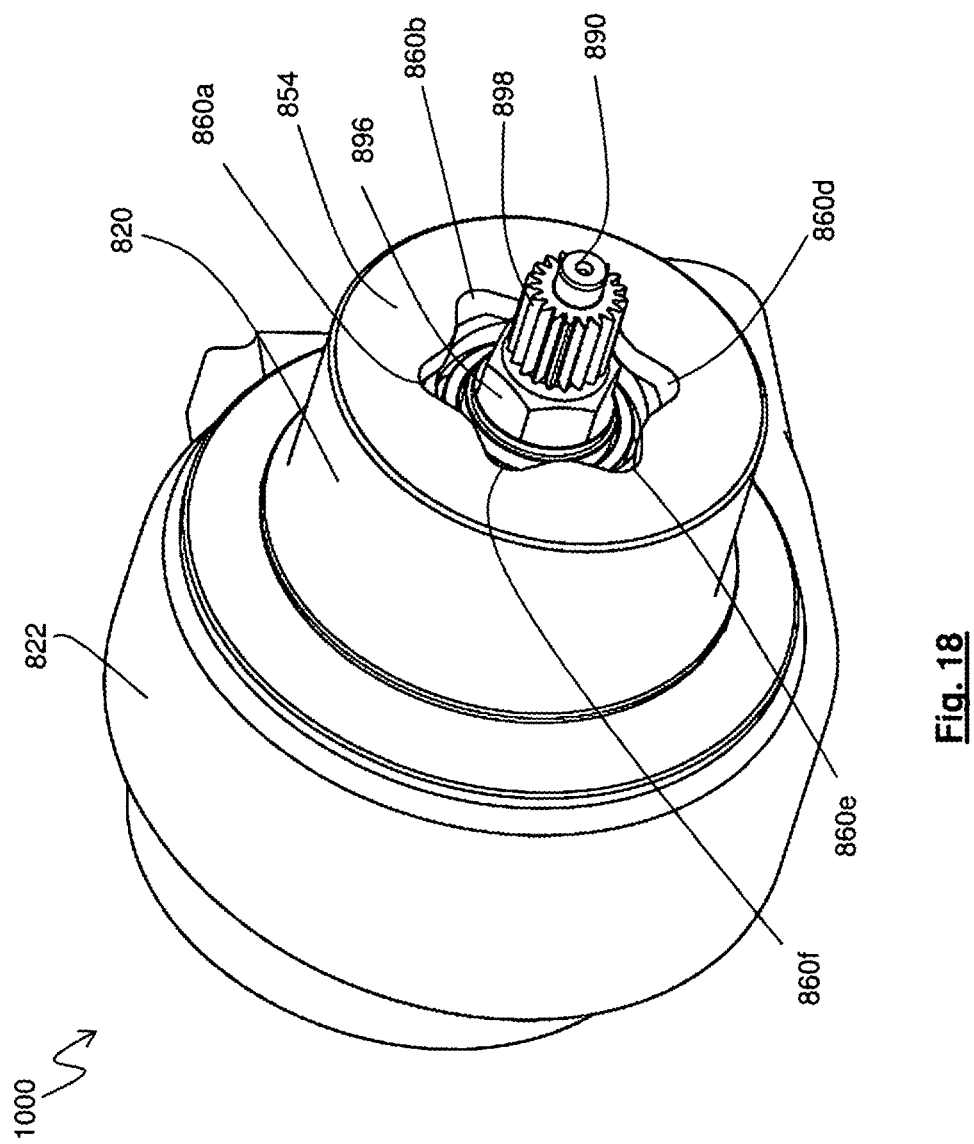
FIG. 18 is a perspective view of an expansion turbine according to an embodiment of the disclosure.
Figure 19:
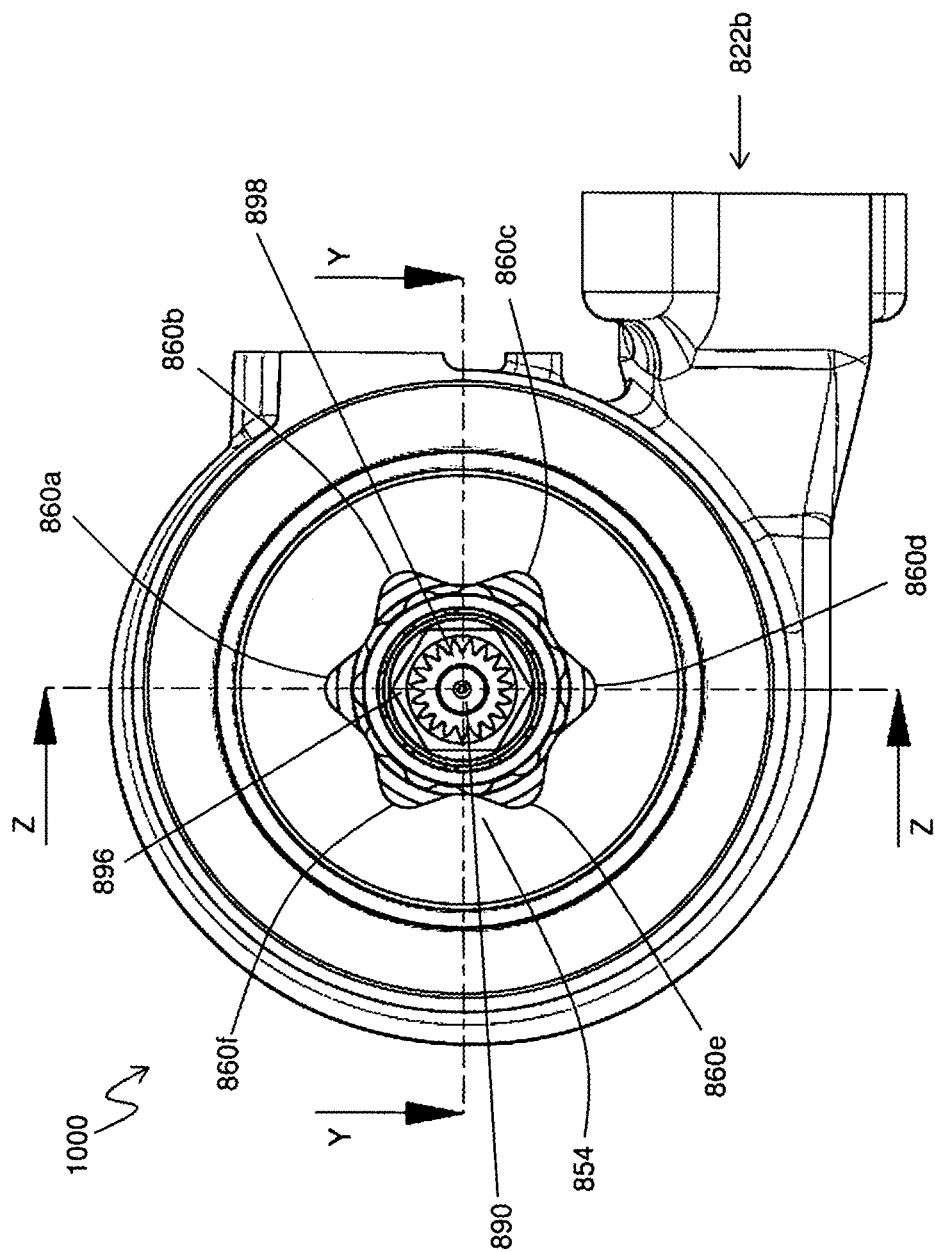
FIG. 19 is an end view of the expansion turbine of FIG. 18.
Figure 22:
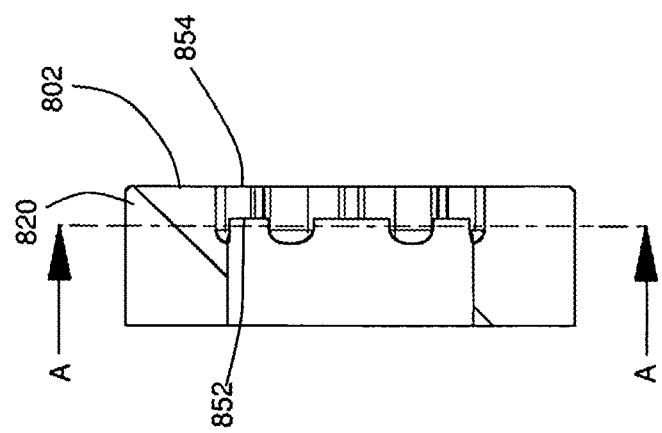
FIG. 22 shows, in isolation, a portion of a housing of the expansion turbine of FIG. 18 proximate to its second end.
Figure 21:
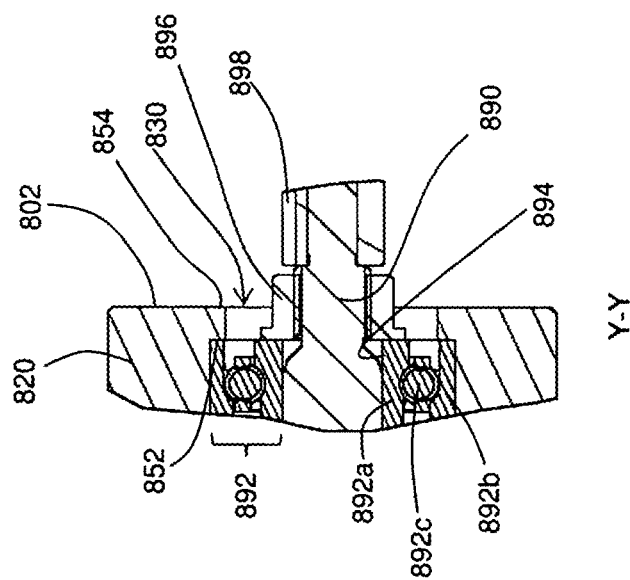
FIG. 21 is a cross sectional view of a portion of the expansion turbine of FIG. 18 through the line and Y-Y.
Figure 23:
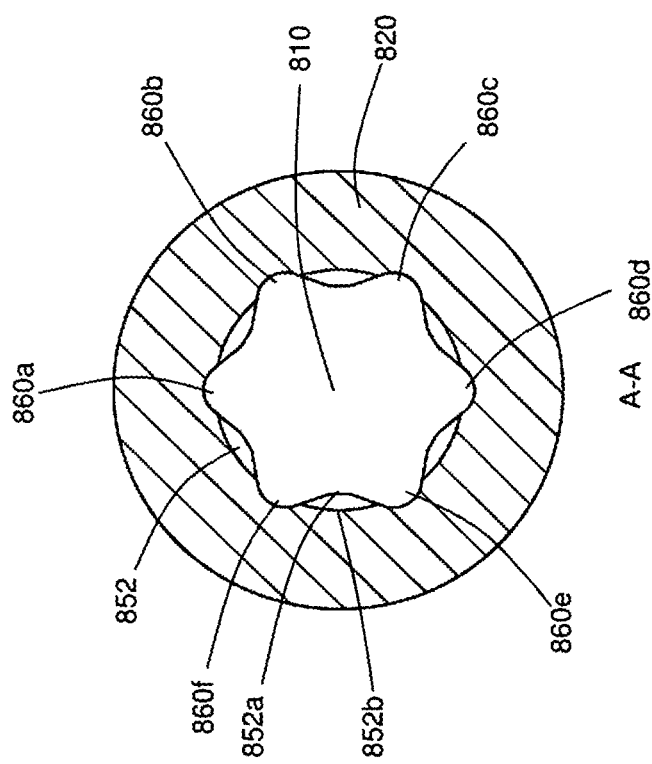
FIG. 23 is a partial cross section (through the line A-A) of the portion of the housing shown in FIG. 22.

FIGS. 18 and 19 show perspective and end views respectively of an expansion turbine 1000. The expansion turbine 1000 may, for example, form part of a waste heat recovery system of an engine assembly. Housing 800 comprises a generally cylindrical body 820 formed by a curved wall arranged around an axis 810 extending between first and second ends 801, 802. FIG. 20 shows a cross section of expansion turbine 1000 through line Z-Z of FIG. 19. FIG. 21 shows a portion of expansion turbine 1000 in cross section through line Y-Y of FIG. 19. FIG. 22 shows in isolation (i.e. with other parts removed) a portion of body 820 proximate to the second end 802. FIG. 23 shows a partial cross section (through the line A-A) of the portion of body 820 shown in FIG. 22. Housing 800 and end cap 900 form part of expansion turbine 1000 and house a bearing assembly 892.

Body 820 defines a bore 840 for receipt of a bearing assembly 892 through a first end 801 of body 820. Body 820 further defines an aperture 830 extending from bore 840 through an axial end of the body 820 for receipt of a shaft 890 when supported by the bearing assembly 892.

The radial extent of the aperture 830 is smaller than that of the bore 840. Therefore a thrust surface 852 is formed (see FIGS. 21 and 23). Thrust surface 852 is generally perpendicular to the axis 810 and defines an internal axial end of the bore 840. In use, thrust surface 852 is suitable for contacting an end of a bearing assembly 892, as now described.

In use, a generally cylindrical bearing assembly 892 is inserted into the bore 840 through the first end 801 until the bearing assembly abuts the thrust surface 852. An inner diameter of the bore 840 substantially matches an outer diameter of the bearing assembly 892 such that it is a close fit within the bore 840. In this embodiment, the bearing assembly 892 is a rolling element bearing assembly, comprising an inner race 892a, an outer race 892b and a plurality of rolling elements 892c disposed therebetween. It will be appreciated that other types of bearing assembly may alternatively be used. The bearing assembly 892 is arranged to support a shaft 890 for rotation about the axis 810. For this purpose, a central bore 894 extends through the inner race 892a for receipt of the shaft 890, which, in use, is generally aligned with the aperture 830. In use, the shaft 890 is received within the central bore 894 of the bearing assembly 892 defined by the inner race 892a and extends through the aperture 830 out of the second end 802 of housing 800. A nut 896 is provided to lock the shaft 890 to the inner race 892a of the bearing assembly.

A gear wheel 898 is mounted onto a portion of the shaft 890 which extends axially outboard of the second end 802 of housing 800 for rotation about axis 810. The expansion turbine 1000 may form part of a turbine generator and the gear wheel 898 may be used to drive the rotor of an electrical generator.

The body 820 defines six cut away sections 860a-860f that each extends through the body 820 from the thrust surface 852 to an opposite surface 854 of the body. Each of the cut away sections 860a-860f forms an extension of the aperture 830. That is, there is no separation between the aperture 830 that is for receipt of shaft 890 and the six cut away sections 860a-860f. Therefore, in use, even when a shaft 890 is received in the aperture 830, each of the cut away sections 860a-860f provides a passageway between the thrust surface 852 and the opposite surface 854. As can be seen in FIGS. 18, 19 and 23, in section through a plane perpendicular to the axis 810 of the housing 800, each of the cut away sections 860a-860f is generally triangular in shape with rounded corners and extends radially from the aperture 830. It will be appreciated that in other embodiments, the cut away sections may have a different shape. Each of the six cut away sections 860a-860f defines a passageway along which a lubricant can flow away from the thrust surface 852. The cut away sections 860a-860f extend axially through the body 820 from the thrust surface 852 to opposing surface 854. Further, the cut away sections 860a-860f extend radially from an inner radial edge 852a of the thrust surface 852, through an outer radial edge 852b of the thrust surface 852 and radially outboard of the bore 840.

As explained above, when a bearing assembly 892 is received within the bore 840, it is axially constrained by the thrust surface 852. That is, the housing 820 acts to support the bearing assembly 892. The six cut away sections 860a-860f break the thrust surface 852 into six portions. The cut away sections 860a-860f define six channels through which a lubricant that is supplied to the bearing assembly may flow away from the bearing assembly 892. Therefore, advantageously, the housing 800 provides a thrust surface 852 that will provide axial support for the bearing assembly around its circumference whilst providing six channels through which a lubricant that is supplied to the bearing assembly may drain away from the bearing assembly 892.

Although in this embodiment, the body 820 defines six cut away sections 860a-860f that each extends through the body 820 from the thrust surface 852 to an opposite surface 854 of the body 820, in other embodiments a different number of cut away sections may be provided. In general, at least one cut away section may be provided.

End cap 900 comprises a body, which in turn comprises a generally cylindrical portion 920 formed by a curved wall arranged around an axis that is, in use, aligned with axis 810. The body further comprises a generally annular flange 925 surrounding the generally cylindrical portion 920. The body further comprises an aperture 930 extending through the cylindrical portion 920 for receipt of shaft 890. An axially facing thrust surface 952 is defined by the cylindrical portion 920 of the body. Thrust surface 952 is generally perpendicular its axis and defines an end of the body. In use, thrust surface 952 is suitable for contacting an end of bearing assembly 892, as now described.

An outer dimension of generally cylindrical portion 920 substantially matches an inner dimension of the bore 840 in the body 820 of the bearing housing 800. Once the bearing assembly 892 has been inserted into the bore 840 in the body 820 of the bearing housing, the generally cylindrical portion 920 of end cap 900 is inserted into the bore 840 until thrust surface 952 abuts bearing assembly 892 (in particular outer race 892b). Flange 925 abuts the first end 801 of body 820.

In an embodiment, the cylindrical portion 920 of the body defines a plurality of (for example six) recesses (not shown) in thrust surface 952. The recesses may, for example, be substantially the same as the recesses formed on the thrust surface 152 of any of the embodiments 100, 200, 300, 400, 500, 600, 700. For example, each of the recesses may extend into the body of end cap 900, extending axially away from the thrust surface 952. Further, each of the recesses may also extend radially from aperture 930 to a radially outer surface of the body. Each recess defines a passageway along which a lubricant can flow away from the thrust surface 952.

In use, bearing assembly 892 is axially constrained at one end by thrust surface 852 and at an opposite end by thrust surface 952. That is, both housing 820 and end cap 900 act to support the bearing assembly 892. The recesses break the thrust surface 952 into a plurality of portions. The recesses define a plurality of channels through which a lubricant that is supplied to the bearing assembly 892 may flow away from the bearing assembly 892. Therefore, advantageously, the end cap 900 provides a thrust surface 952 that will provide axial support for the bearing assembly around its circumference whilst providing channels through which a lubricant that is supplied to the bearing assembly may drain away from the bearing assembly 892.

At the first end 801 of body 820, a turbine housing 822 is formed. Turbine housing 822 may be integrally formed with body 820. Alternatively, turbine housing 822 and body 820 may be formed separately and connected in any suitable fashion. Turbine housing 822 houses a turbine wheel 1010, which is connected to shaft 890. In use, a working fluid flows through the turbine housing 822 between an inlet 822a and an outlet 822b, causing the turbine wheel 1010 and the attached shaft 890 to rotate. A stator nozzle 1020 is disposed upstream of the turbine wheel 1010. Stator nozzle 1020 comprises a plurality of guide vanes 1022 that are arranged to direct the flow of working fluid from inlet 822a to the turbine wheel 1010. Shaft 890 acts to transmit torque to gear wheel 898, causing it to rotate.

At the second end 802 of body 820, a gearing housing (not shown) may be formed. Gearing housing may contain gear wheel 898 and one or more other gear wheels (no shown) that are arranged to engage with gear wheel 898. Gearing housing may be of the form of a cap provided over the second end 802 of body 820. For example, the gearing housing may be provided with a generally cylindrical bore for receipt of at least part of body 820. An outer dimension of body 820 may substantially match an inner dimension of the bore in the gearing housing and O-rings may be provided in annular grooves 824 on an outer surface of body 820 to seal body 820 to gearing housing.

In use, the bearing assembly 892 will be provided with a supply of lubricant via one or more passageways (not shown) in body 820. For this purpose, the housing 800 may comprise a lubricant inlet bore (not shown) in the conventional manner. Lubricant can drain out of the second end 802 of body 820 into gearing housing via cut away sections 860a-860f. The gear wheel 898, and any other gear wheels contained in the gearing housing, can operate in the presence of lubricant from the bearing assembly 892. Gearing housing may be provided with a drain bore to allow lubricant to exit the gearing housing.

It may be undesirable for lubricant to penetrate into the turbine housing 822. Therefore, proximate the first end 801 of body 820 a drain bore (not shown) is provided that extends from an outer surface of the body 820 of the housing 800 to an axial position in bore 840 that is aligned with end cap 900. The drain bore may be aligned with one of the recesses in the thrust surface 952 of the end cap 900. For embodiments wherein the housing 800 forms part of a waste heat recovery system comprising an organic Rankine cycle (ORC), the lubricant may comprise the working fluid of the ORC. Alternatively, the lubricant may comprise oil. For embodiments wherein the lubricant is the working fluid of an ORC, the lubricant may enter the housing 800 as a liquid and may exit the housing 800 as a vapour. Therefore, for such embodiments, the drain bore may be provided at an angular position which, in use, coincides with, or is close to, a highest point of the housing 800. For embodiments wherein the lubricant is oil, the drain bore may be provided at an angular position which, in use, coincides with, or is close to, a lowest point of the housing.

Further embodiments of apparatus for supporting a bearing assembly are now described with reference to FIGS. 24 to 29.

Figure 24:
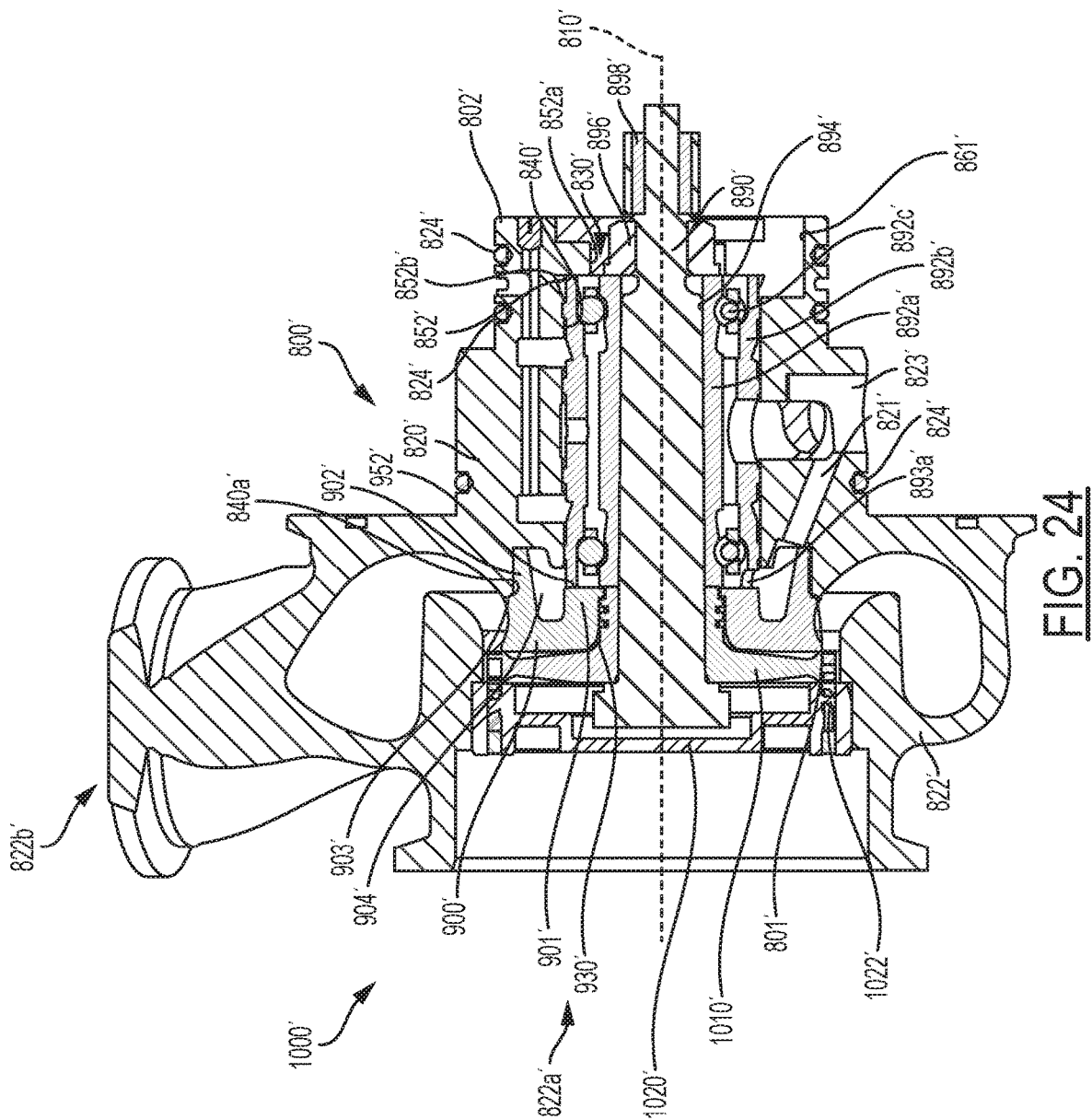
FIG. 24 is a cross sectional view of an expansion turbine according to an embodiment of the disclosure.

FIG. 24 shows a cross sectional view of an alternative embodiment of an expansion turbine 1000'. The expansion turbine 1000' shown in FIG. 24 is generally of the same form as the expansion turbine 1000 shown in FIGS. 18-23 and described above. The reference labels for features of expansion turbine 1000' have the same reference number for the corresponding features of expansion turbine 1000 but are primed. For example, housing 800' corresponds to housing 800. Only the differences between the expansion turbine 1000' shown in FIG. 24 and the expansion turbine 1000 shown in FIGS. 18-23 will be described in detail below. Unless otherwise stated, features of expansion turbine 1000' are generally similar in structure and function to the corresponding features of expansion turbine 1000.

The expansion turbine 1000' may, for example, form part of a waste heat recovery system of an engine assembly. Expansion turbine 1000' comprises a housing 800' and end cap 900', which house a bearing assembly 892'.

Housing 800' comprises a generally cylindrical body 820' formed by a curved wall arranged around an axis 810' extending between first and second ends 801', 802'. An outer radial surface of the body 820' is stepped such that it is provided with a smaller diameter portion proximate to the second end 802' and a larger diameter portion proximate to the first end 801'.

Body 820' defines: a bore 840' for receipt of a bearing assembly 892'; and an aperture 830' for receipt of a shaft 890' when supported by the bearing assembly 892'. A thrust surface 852' defines an internal axial end of the bore 840'. In use, thrust surface 852' is suitable for contacting an end of a bearing assembly 892'.

Figure 25:
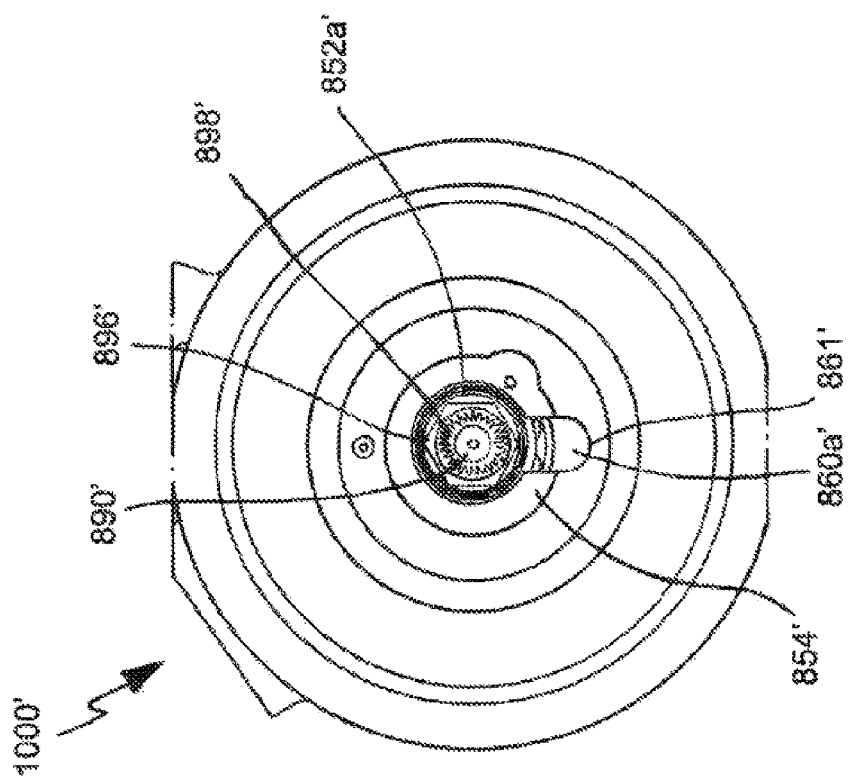
FIG. 25 is an end view of the expansion turbine of FIG. 24.

The body 820' defines a single cut away section 860a'. Cut away section 860a' extends through the body 820' from the thrust surface 852' to an opposite surface 854' of the body 820'. Cut away section 860a' forms an extension of the aperture 830'. That is, there is no separation between the aperture 830' that is for receipt of shaft 890' and the cut away section 860a'. Therefore, in use, even when a shaft 890' is received in the aperture 830', of the cut away section 860a' provides a passageway between the thrust surface 852' and the opposite surface 854'. As can be seen in FIG. 25, in section through a plane perpendicular to the axis 810' of the housing 800', the cut away section 860a' is generally rectangular in shape with rounded corners and extends radially from the aperture 830'. It will be appreciated that in other embodiments, the cut away section may have a different shape. The cut away section 860a' defines a passageway along which a lubricant can flow away from the thrust surface 852'. The cut away section 860a' extends axially through the body 820' from the thrust surface 852' to opposing surface 854'. Further, the cut away section 860a' extends radially from an inner radial edge 852a' of the thrust surface 852', through an outer radial edge 852b' of the thrust surface 852' and radially outboard of the bore 840' to an outer radial edge 861' of the cut away section 860a'.

Cut away section 860a' may be machined in the body 820' from surface 854'. Body 820' may be formed from casting.

Figure 26:
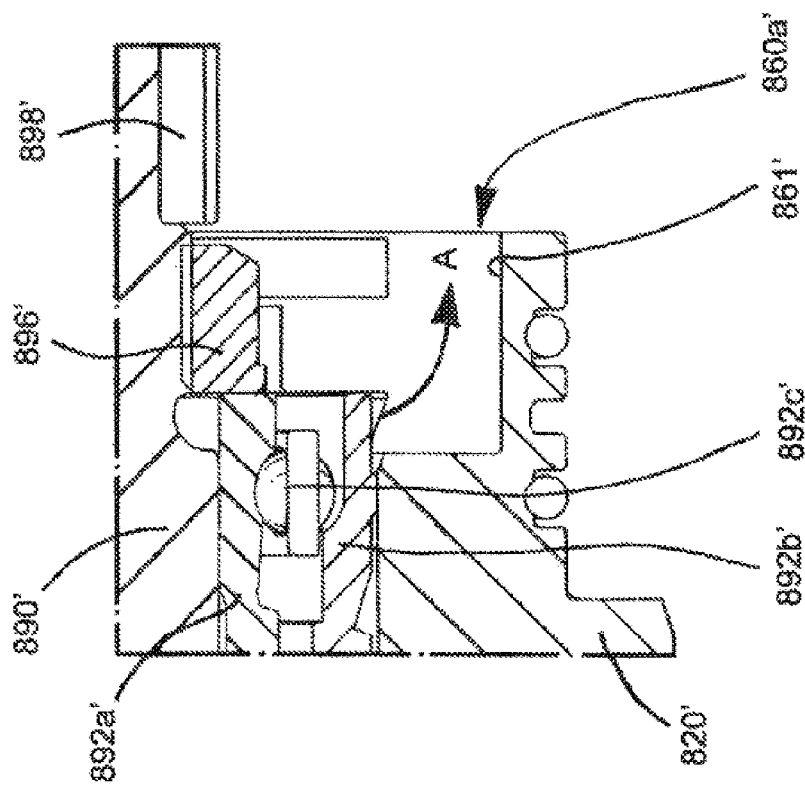
FIG. 26 is an enlarged portion of the cross sectional view of the expansion turbine of FIG. 24.

When a bearing assembly 892' is received within the bore 840', it is axially constrained by the thrust surface 852' such that the body 820' acts to support the bearing assembly 892'. The cut away section 860a' breaks the thrust surface 852' into two portions. As can be seen in FIG. 26, the cut away section 860a' defines a channel through which a lubricant that is supplied to the bearing assembly may flow away from the bearing assembly 892', as indicated by arrow A. In use, the housing 820' may be generally orientated such that the cut away surface 860a' is at, or close to, a lower portion of the thrust surface 852'. With such an arrangement, lubricant (for example oil) may drain away from the bearing assembly 892' under gravity. Advantageously, the housing 800' provides a thrust surface 852' that will provide axial support for the bearing assembly around its circumference whilst providing a channel through which a lubricant that is supplied to the bearing assembly may drain away from the bearing assembly 892'.

Although in this embodiment, the body 820' defines a single cut away section 860a' that extends through the body 820' from the thrust surface 852' to an opposite surface 854' of the body 820', in other embodiments a different number of cut away sections may be provided. In general, at least one cut away section may be provided.

The bore 840' is stepped such that a larger diameter portion 840a' is provided proximate first end 801'. End cap 900' comprises a body, which in turn comprises a radially inner portion 901' and a radially outer portion 902'. The body is generally rotationally symmetric about an axis that is, in use, aligned with axis 810'. The radially outer portion 902' of the body is received within the larger diameter portion 840a' of the bore 840'. The body further comprises a flange 903' surrounding the radially outer portion 902'. The body further comprises an aperture 930' extending through the radially inner portion 901' for receipt of shaft 890'.

An axially facing thrust surface 952' is defined by the radially inner portion 901' of the body. Thrust surface 952' defines an end of the body and is generally perpendicular its axis. In use, thrust surface 952' is suitable for contacting an end of bearing assembly 892, as now described.

An outer dimension of the radially outer portion 902' substantially matches an inner dimension of the larger diameter portion 840a' of the bore 840'. Once the bearing assembly 892' has been inserted into the bore 840' in the body 820' of the bearing housing, the radially outer portion 902' of end cap 900' is inserted into the larger diameter portion 840a' of the bore 840' until thrust surface 952' abuts bearing assembly 892' (in particular outer race 892b'). Flange 903' abuts the first end 801' of body 820'.

Between the radially inner 901' and radially outer 902' portions of the body of end cap 900', the body defines one or more recesses. In the present embodiment, a generally toroidal recess 904' is provided between the radially inner 901' and radially outer 902' portions, which extends around the entire circumference of the end cap 900'. In alternative embodiments, a plurality of (for example six) recesses may be provided around the circumference of the end cap 900'.

Figure 27:
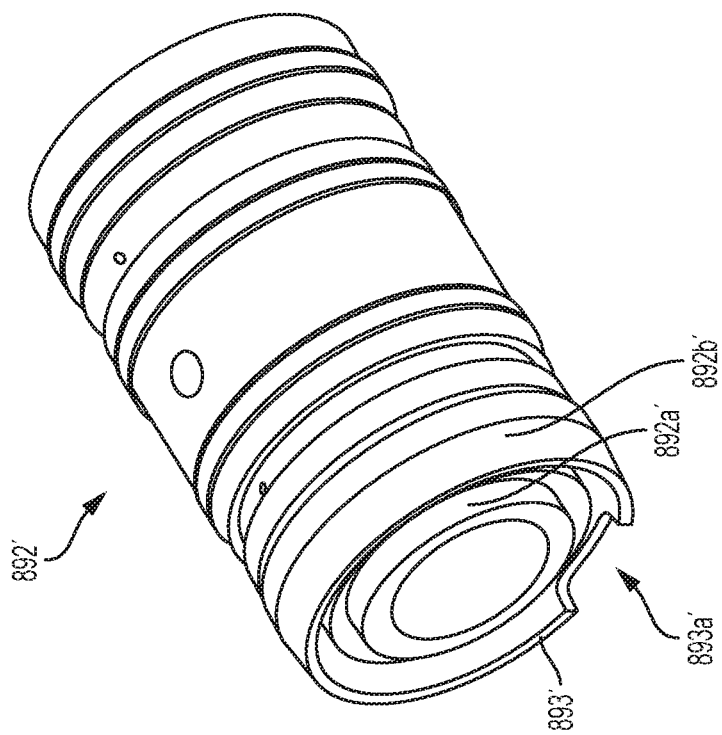
FIG. 27 is a perspective view of a bearing assembly that forms part of the expansion turbine of FIG. 24.

In this embodiment at least one recess is provided on an axially facing end surface 893' of the outer race 892b' of the bearing assembly 892', as now described. As can be seen most clearly in FIG. 27, the bearing assembly 892' is generally cylindrical in shape. In particular, the outer race 892b' is generally tubular and is provided at each end with an axially facing end surface 893'. Only one end surface 893' is shown in FIG. 27. The end surfaces 893' are generally planar and are generally annular in shape. In use, each end surface 893' is suitable for contacting a corresponding thrust surface 852', 952' of the assembly. In particular, one end surface (not shown in FIG. 27) contacts the thrust surface 852' defined by the body 820' of the housing 800'. Similarly, the other end surface 893' contacts the thrust surface 952' defined by the end cap 900'. In this way, the bearing assembly 892' is axially constrained at both ends by the housing 800' and end cap 900'.

The end surface 893' of the outer race 892b' that contacts the thrust surface 952' defined by the end cap 900' defines a single recess 893a'. Recess 893a' extends axially away from the end surface 893' across its entire radial extent and along a circumferential portion which, in use, may be at, or close to, a lower portion of the end surface 893'. The recess 893a' defines a passageway along which a lubricant can flow away from the thrust surface 952' of the end cap 900'.

Together thrust surface 952' and end surface 893' axially constrain the bearing assembly 892' at one end, providing support for the bearing assembly 892'. The recess 893a' breaks the end surface 893' into two portions.

It may be undesirable for lubricant to penetrate into the turbine housing 822'. Therefore, proximate the first end 801' of body 820' one or more drain bores 821' are provided. In the present embodiment, three drain bores 821' are provided in the body 820', as can be seen most clearly in FIG. 28. In other embodiments, more than three or fewer than three drain bores 821' may be provided. In general, at least one drain bore 821' is provided proximate the first end 801' of body 820'.

The drain bores 821' may, for example, be machined in the body 820', for example by drilling. The body 820' may be formed by casting.

Each drain bore 821' extends from a main drain bore 823' of the body 820' of the housing 800' to an interior surface of the larger diameter portion 840a' of the bore 840'. In particular, the drain bores 821' connect to the recess 904' in the end cap 900'. Together with the main drain bore 823', each drain bore 821' provides a passageway from the recess 904' to an outer surface of the body 820' of the housing 800'.

Figure 29:
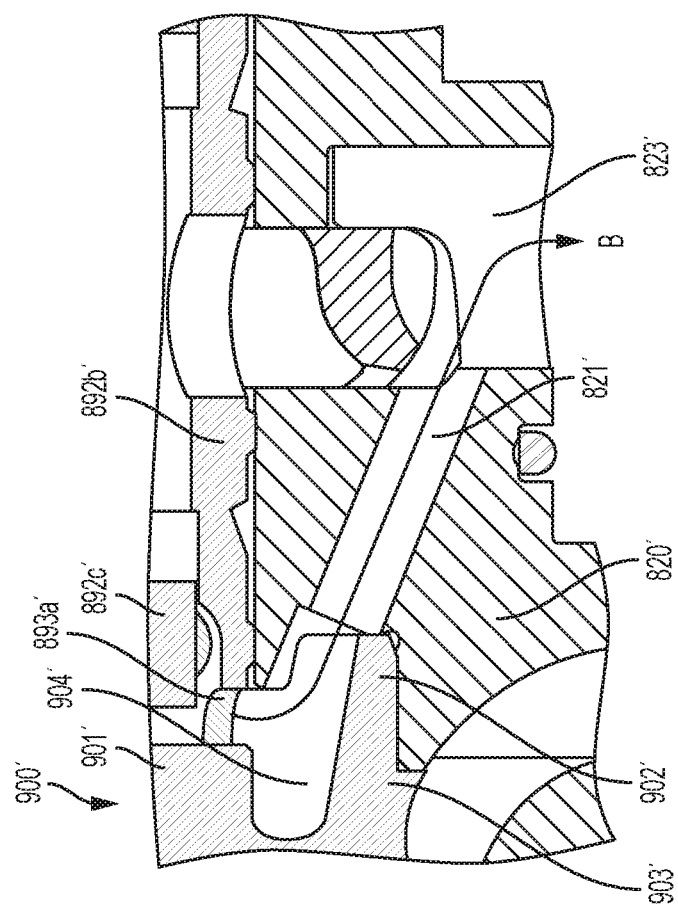
FIG. 29 is a second enlarged portion of the cross sectional view of the expansion turbine of FIG. 24.

As can be seen in FIG. 29, in use, lubricant can drain from the bearing assembly 892', via recess 893a' in the end surface 893' of the outer race 892b', into the recess 904'. From recess 904', lubricant can drain via drain bores 821' into the main drain bore 823' and out of the body 820' of the housing 800'. This flow path of lubricant is indicated in FIG. 29 by arrow B.

For embodiments wherein the housing 800' forms part of a waste heat recovery system comprising an organic Rankine cycle (ORC), the lubricant may comprise the working fluid of the ORC. Alternatively, the lubricant may comprise oil. For embodiments wherein the lubricant is the working fluid of an ORC, the lubricant may enter the housing 800' as a liquid and may exit the housing 800' as a vapour. Therefore, for such embodiments, the drain bores 821' may be provided at angular positions which, in use, coincide with, or are close to, a highest point of the housing 800'. For embodiments wherein the lubricant is oil, the drain bores 821' may be provided at angular positions which, in use, coincide with, or are close to, a lowest point of the housing 800'.

Although in the present embodiment a single recess 893a' is provided in the outer race 892b', it will be appreciated that in alternative embodiments a plurality of recesses 893a' may provided in the outer race 892b'. Such an arrangement may further aid drainage of lubricant away from the bearing assembly 892.

In addition to aiding the drainage of lubricant from the bearing assembly 892', the recess 893a' in the outer race 892b' can also be used to aid alignment of the bearing assembly 892' during assembly. For example, the recess 893a' may be used to rotate the outer race 892b' of the bearing assembly 892' about axis 810' once it is installed in bore 840'. Additionally or alternatively, the recess 893a' may be used to locate in a press tool so that an orientation of the bearing assembly 892 (relative to housing 800) is fixed prior to pressing.

Further embodiments of apparatus for supporting a bearing assembly are now described with reference to FIGS. 30 to 31.

Figure 30:
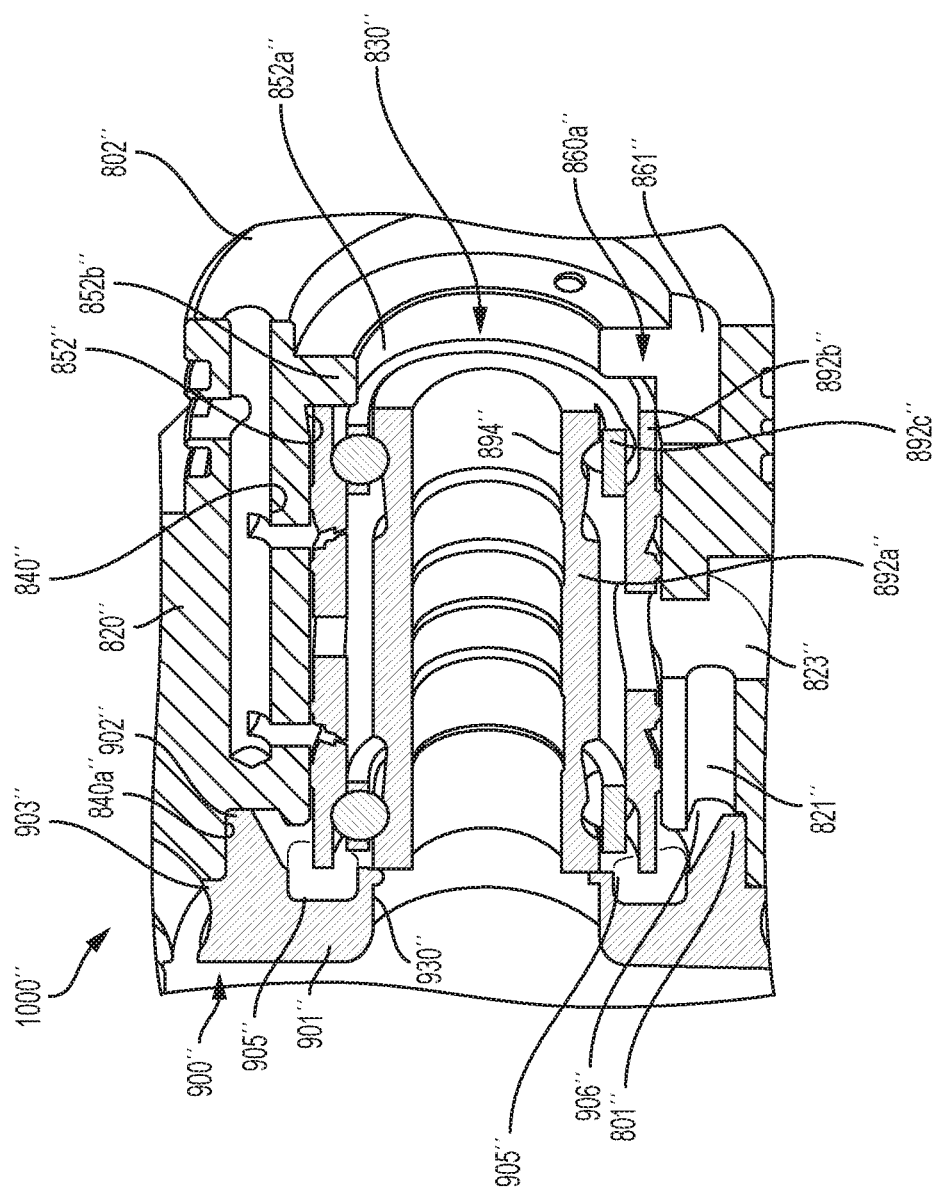
FIG. 30 is a partial cross sectional view of part of an expansion turbine according to an embodiment of the disclosure.
Figure 31:
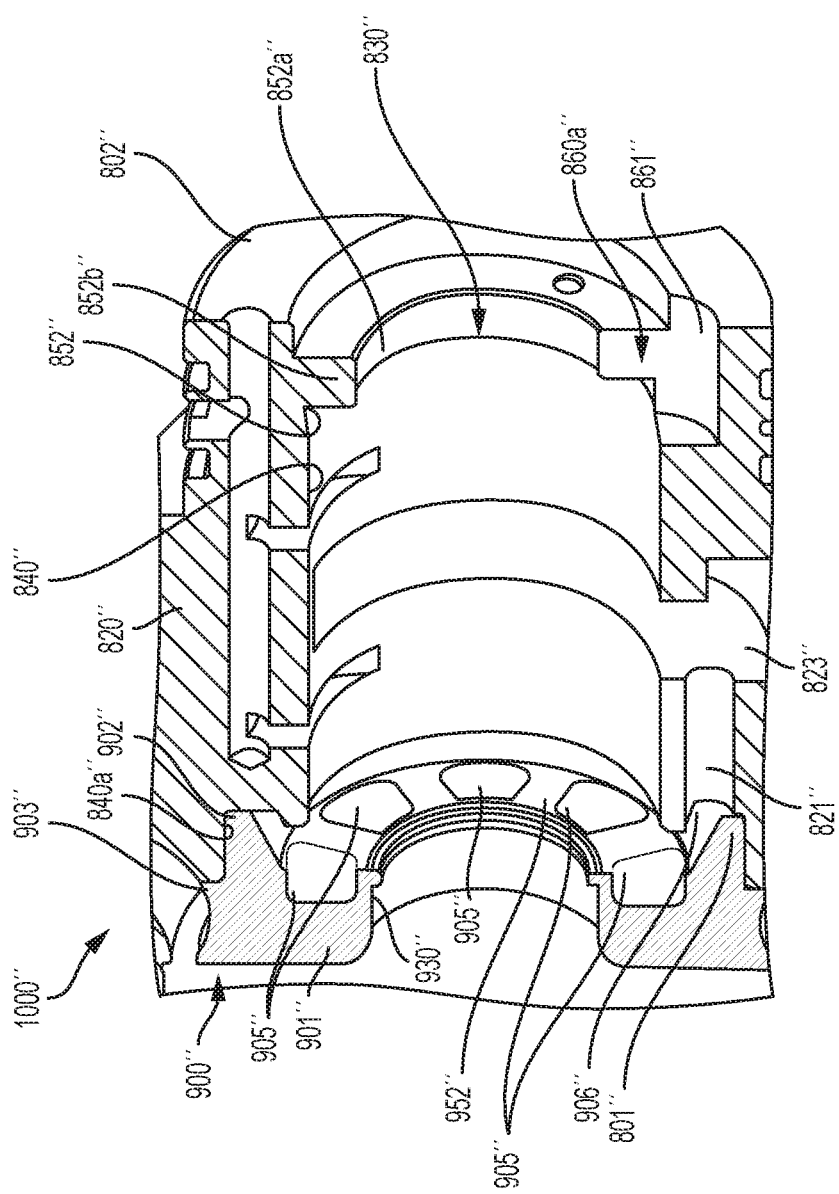
FIG. 31 is a partial cross sectional view of the part of an expansion turbine shown in FIG. 30 with the bearing assembly removed.

FIGS. 30 and 31 show partial cross sectional views of part of an alternative embodiment of an expansion turbine 1000". The expansion turbine 1000" shown in FIGS. 30 and 31 is generally of the same form as the expansion turbine 1000' shown in FIGS. 24-29 and described above. The reference labels for features of expansion turbine 1000" have the same reference number for the corresponding features of expansion turbine 1000' but are double-primed. For example, housing 800" corresponds to housing 800'. Only the differences between the expansion turbine 1000" shown in FIGS. 30 and 31 and the expansion turbine 1000' shown in FIGS. 24-29 will be described in detail below. Unless otherwise stated, features of expansion turbine 1000" are generally similar in structure and function to the corresponding features of expansion turbine 1000'.

End cap 900" comprises a body, which in turn comprises a radially inner portion 901" and a radially outer portion 902". The radially outer portion 902" of the body is received within a larger diameter portion 840a" of the bore 840". The body further comprises a flange 903" surrounding the radially outer portion 902". The body further comprises an aperture 930" extending through the radially inner portion 901" for receipt of a shaft (not shown).

An axially facing thrust surface 952" (see FIG. 31) is defined by the radially inner portion 901" of the body. Thrust surface 952" defines an end of the body and is generally perpendicular its axis. In use, thrust surface 952" is suitable for contacting an end of bearing assembly.

As can be seen most clearly in FIG. 31, the body defines a plurality of (for example eight) recesses 905" in thrust surface 952". In alternative embodiments, the recesses 905" may, for example, be substantially the same as the recesses formed on the thrust surface 152 of any of the embodiments 100, 200, 300, 400, 500, 600, 700.

Each of the recesses 905" extends into the body of end cap 900", extending axially away from the thrust surface 952". Further, each of the recesses 905" also extends radially from a radial position generally between the inner and outer races 892a", 892b" to a radial position radially outboard of the outer race 892b". Each recess 905" defines a passageway along which a lubricant can flow away from the thrust surface 952".

In use, the bearing assembly is axially constrained at one end by thrust surface 852" and at an opposite end by thrust surface 952". The recesses 905" break the thrust surface 952" into a plurality of portions. The recesses 905" define a plurality of channels through which a lubricant that is supplied to the bearing assembly may flow away from the bearing assembly.

A circumferentially extending groove 906" is defined by the radially outer portion 902". The groove 906" connects all of the recesses 905" together. Lubricant can drain, for example, under gravity from one recess 905" to another 905". One or more drain bores 821" are provided in the body 820". The bore 821" extends from a main drain bore 823" of the body 820" of the housing 800" to an interior surface of the larger diameter portion 840a" of the bore 840". The drain bores 821" connect to the recess groove 906" in the end cap 900". Together with the main drain bore 823", the drain bore 821" provides a passageway from the groove 906" to an outer surface of the body 820" of the housing 800".

It will be appreciated that any of the features from any of the above-described embodiments of an expansion turbine 1000, 1000', 1000" may be combined with any of the other embodiments of an expansion turbine 1000, 1000', 1000" as appropriate.

While specific embodiments of the disclosure have been described above, it will be appreciated that the disclosure may be practiced otherwise than as described. The descriptions above are intended to be illustrative, not limiting. Thus it will be apparent to one skilled in the art that modifications may be made to the disclosure as described without departing from the scope of the claims set out below.

It will be appreciated that any features of one of the specific embodiments described above may be combined with any of the other specific embodiments where compatible.

While the disclosure has been illustrated and described in detail in the drawings and foregoing description, the same is to be considered as illustrative and not restrictive in character, it being understood that only the preferred embodiments have been shown and described and that all changes and modifications that come within the scope of the disclosures as defined in the claims are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. For the avoidance of doubt, optional and/or preferred features as set out herein may be used either individually or in combination with each other where appropriate and particularly in the combinations as set out in the accompanying claims. The optional and/or preferred features for each aspect of the disclosure set out herein are also applicable to any other aspects of the disclosure, where appropriate.

The invention claimed is:

1. A bearing assembly support, comprising a body, the body defining:
   a thrust surface for contacting an end of a bearing assembly;
   an aperture extending through the body for receipt of a shaft when supported by the bearing assembly; and
   at least one passageway along which a lubricant can flow away from the thrust surface during use;
   wherein the or each passageway is defined by either:
      a recess on the thrust surface; or
      a cut away section that extends through the body from the thrust surface to an opposite surface of the body;
   wherein the at least one passageway comprises a plurality of passageways defined by the body, each passageway extending from a different region of the thrust surface, the plurality of passageways being angularly spaced around an axis of the body; and
   wherein the thrust surface comprises a plurality of sections and the passageways that extend from the regions within one of the plurality of sections are different from the passageways that extend from the regions within the or each other section.

2. The bearing assembly support of claim 1, wherein, when the or each passageway is defined by a cut away section, the cut away section forms an extension of the aperture.

3. The bearing assembly support of claim 1, wherein the or each passageway extends generally radially outwards from the aperture.

4. The bearing assembly support of claim 1, wherein at least a portion of the or each passageway extends radially outboard of the thrust surface.

5. The bearing assembly support of claim 1, wherein the body is a housing, the body comprising a bore for receipt of the bearing assembly and wherein the thrust surface defines an internal end of said bore.

6. The bearing assembly support of claim 5, wherein the bore is a stepped bore extending through the body, the stepped bore comprising: a first bore section for receipt of a shaft; a second bore section of different diameter to the first bore section for receipt of the bearing assembly arranged to support the shaft; and a shoulder between the first and second bore sections which defines an internal end of the second bore section, the second bore section defining the aperture, and the shoulder defining the thrust surface.

7. The bearing assembly support of claim 1, wherein the body is an end cap for a bearing housing.

8. The bearing assembly support of claim 7, wherein the body comprises a cylindrical portion for insertion into a bore of the bearing housing.

9. The bearing assembly support of claim 1, wherein two passageways that extend from regions within a given section of the plurality of sections are identical in shape and dimensions and the shape and/or dimensions of two passageways that extend from regions within at least one other section of the plurality of sections is different.

10. The bearing assembly support of claim 1, wherein a spacing of the plurality of passageways that extend from the regions within a given section of the plurality of sections is even and a spacing of the plurality of passageways that extend from the regions within at least one other section of the plurality of sections is different.

11. The bearing assembly support of claim 1, wherein one or more passages connect two or more of the plurality of passageways such that they are in fluid communication.

12. The bearing assembly support of claim 1, wherein the or each passageway tapers in a radial direction.

13. The bearing assembly support of claim 12, wherein an angular extent of the or each passageway tapers outwards from a radially inner side of that passageway to a radially outer side of that passageway.

14. The bearing assembly support of claim 12, wherein an angular extent of the or each passageway tapers inwards from a radially inner side of that passageway to a radially outer side of that passageway.

15. The bearing assembly support of claim 12, wherein an axial extent of the or each passageway tapers either inwards or outwards from a radially inner side of that passageway to a radially outer side of that passageway.

16. The bearing assembly support of claim 1, wherein in section through a plane perpendicular to an axis of the bearing assembly support, the or each passageway is rectangular in shape.

17. The bearing assembly support of claim 1, wherein in section through a plane perpendicular to an axis of the bearing assembly support, the or each passageway spirals outwards in a radial direction.

18. The bearing assembly support of claim 1, further comprising a lubricant drain bore that connects an outer surface of the bearing assembly support to one of the at least one passageways.

19. A turbomachine comprising:
   a shaft;
   a bearing assembly arranged to support the shaft for rotation about an axis;
   a turbine wheel connected to the shaft; and
   a bearing assembly support comprising a body, the body defining: a thrust surface in contact with an end surface of the bearing assembly; an aperture extending through the body for receipt of the shaft;
   wherein at least one passageway is defined by at least one of the body of the bearing support and the bearing assembly, along which a lubricant can flow away from the bearing assembly during use, wherein the or each passageway is defined by either:
      a recess on the thrust surface of the bearing assembly support;
      a cut away section that extends through the body of the bearing assembly support from the thrust surface to an opposite surface of said body; or
      a recess provided on the end surface of the bearing assembly.

20. The turbomachine of claim 19, wherein the turbomachine comprises: an expansion turbine; a turbocharger; or a turbocompound.

21. An engine assembly comprising a turbomachine according to claim 19.

22. The turbomachine of claim 19, further comprising a second bearing assembly support comprising a second body, the second body defining: a second thrust surface in contact with a second end surface of the bearing assembly; a second aperture extending through the second body for receipt of the shaft;

wherein at least one passageway is defined by at least one of the second body of the second bearing support and the bearing assembly, along which a lubricant can flow away from the bearing assembly during use, wherein the or each passageway is defined by either:

a recess on the second thrust surface of the second bearing assembly support;

a cut away section that extends through the second body of the second bearing assembly support from the second thrust surface to an opposite surface of said second body; or a recess provided on the second end surface of the bearing assembly.

23. The turbomachine of claim 22, wherein the body of the bearing assembly support is a housing, the body comprising a bore for receipt of the bearing assembly and wherein the thrust surface defines an internal end of said bore.

24. The turbomachine of claim 22, wherein the second body of the second bearing assembly support is an end cap for a bearing housing.

25. The turbomachine of claim 22, wherein at least one of the bearing assembly support and the second bearing assembly support comprises the bearing assembly support of claim 1.

26. The turbomachine of claim 19, wherein, when the or each passageway is defined by a cut away section, the cut away section forms an extension of the aperture.

27. The turbomachine of claim 19, wherein the or each passageway extends generally radially outwards from the aperture.

28. The turbomachine of claim 19, wherein at least a portion of the or each passageway extends radially outboard of the thrust surface.

29. The turbomachine of claim 23, wherein the bore is a stepped bore extending through the body, the stepped bore comprising: a first bore section for receipt of a shaft; a second bore section of different diameter to the first bore section for receipt of the bearing assembly arranged to support the shaft; and a shoulder between the first and second bore sections which defines an internal end of the second bore section, the second bore section defining the aperture, and the shoulder defining the thrust surface.

30. The turbomachine of claim 24, wherein the second body comprises a cylindrical portion for insertion into a bore of the bearing housing.

31. A method of manufacturing a housing with a lubricant drain, said method comprising the steps of:

providing a bearing assembly support as claimed in claim 1 as part of the housing, wherein the at least one passageway comprises a plurality of passageways defined by the body, the plurality of passageways being angularly spaced around an axis of the body;

selecting one or more of the plurality of passageways; and forming a lubricant drain bore in the housing, wherein said lubricant drain bore connects the one or more selected passageways to an outer surface of the housing.

32. The method of claim 31, wherein the step of selecting one or more of the plurality of passageways involves a selection that is dependent upon how the housing will be orientated in use.

33. The method as claimed in claim 32 wherein during the step of selecting one or more of the plurality of passageways, a passageway is selected that, in use, is the lowest passageway.

\* \* \* \* \*